(12) United States Patent
Parris et al.

(10) Patent No.: US 7,191,666 B2
(45) Date of Patent: Mar. 20, 2007

(54) CHECK VALVE MODULE FOR FLOW METERS

(76) Inventors: Earl H. Parris, 31 N. Washington St., Summerville, GA (US) 30747; Timothy L. Greenfield, 55A Union St., Summerville, GA (US) 30747; Andrew S. Weaver, 316 Paylor St., Summerville, GA (US) 30747

(*) Notice: Subject to any disclaimer, the term of this patent is extended or adjusted under 35 U.S.C. 154(b) by 32 days.

(21) Appl. No.: 11/154,141

(22) Filed: Jun. 16, 2005

(65) Prior Publication Data

US 2006/0283263 A1 Dec. 21, 2006

(51) Int. Cl.
*G01F 1/66* (2006.01)
(52) U.S. Cl. .................................. 73/861.27
(58) Field of Classification Search ................ 73/197, 73/198, 196, 195, 861.75, 861.76, 861.77, 73/861.78, 861.79, 861.27; 310/104
See application file for complete search history.

(56) References Cited

U.S. PATENT DOCUMENTS

| | | | | |
|---|---|---|---|---|
| 4,100,799 A | * | 7/1978 | Bradham et al. | ............. 73/197 |
| 4,175,434 A | | 11/1979 | Bradham, III et al. | |
| 4,217,929 A | * | 8/1980 | Pelt | ......................... 137/527.8 |
| 4,429,571 A | | 2/1984 | Kullmann et al. | |
| 4,437,344 A | | 3/1984 | Karjalainen | |
| 4,512,201 A | * | 4/1985 | Konrad et al. | ........... 73/861.79 |
| 5,085,076 A | * | 2/1992 | Engelmann | .................. 73/197 |
| 5,698,781 A | | 12/1997 | Zellering | |
| 5,831,158 A | | 11/1998 | Schloetterer et al. | |
| 6,343,618 B1 | | 2/2002 | Britt et al. | |
| 6,581,457 B2 | | 6/2003 | Schwartz et al. | |

OTHER PUBLICATIONS

Steve McCoy, "Marketing Memo", Date Unknown, 2 pages, TM-002-R1, Sensus Metering Systems.
Sensus Metering Systems, "FireLine", Date Unknown, 5 pages, FM-720.
Sensus Metering Systems, "Parts List, (SRH) Compound Water Meters", Date Unknown, 6 pages, CM-967-R2.
Neptune, "TRU/FLO Compound Meter", Date Unknown, 4 pages.
Neptune, "TRU/FLO Compound Parts List", Date Unknown, 8 pages.
Meinecke, "Compound Water Meter COSMOS WPVD 3=1", Date Unknown, 4 pages.
Meinecke, "Compound Water Meter", Date Unknown, 4 pages.

(Continued)

*Primary Examiner*—Jewel Thompson
(74) *Attorney, Agent, or Firm*—Simmons Patents; Monty Simmons

(57) ABSTRACT

The present invention relates to an apparatus and method for improved check valve technology used in flow meters, particularly compound/combo meters. The improved check valve technology may be comprised in a single piece module that (1) can easily be removed from the meter without disturbing the metering module, (2) has few or no complicated rollers and pins that require calibration, (3) requires little or no special training to remove, (4) does not require the meter repairperson to move relatively heavy objects, (5) comprises a seal as part of the check valve assembly simplifying seal inspection, seal removal and seal replacement; and (6) is secured in its housing using only external fasteners. The check valve module may be used for upgrading meters installed at customer sites, for upgrading used meters returned for repairs, and for simplifying new meter production.

19 Claims, 20 Drawing Sheets

OTHER PUBLICATIONS

Conbraco Industries, "Appollo/Conbraco Maintenance Manual", BFMM4S00, Date Unknown, 20 pages.

Badger Meter, Inc., "Rocordall Compound Meter—Repair Parts", RC-P-1, Date Unknown, 4 pages.

Badger Meter, Inc., "Rocordall Compound Meter—Repair Parts", RC-P-2, Date Unknown, 4 pages.

Badger Meter, Inc., "Rocordall Compound Meter—Repair Parts", RSC-P-1, Date Unknown, 4 pages.

Badger Meter, Inc., "Rocordall Compound Series Meter—Tehnical Brief", RSC-T-6, Date Unknown, 2 pages.

Badger Meter, Inc.; "Rocordall Compound Series Meter—Tehnical Brief", RSC-T-4, Date Unknown, 2 pages.

Badger Meter, Inc., "Rocordall Compound Series Meter—Tehnical Brief", RSC-T-3, Date Unknown, 2 pages.

Badger Meter, Inc., "Rocordall Compound Series Meter—Tehnical Brief", RSC-T-2, Date Unknown, 2 pages.

AMES, "Series 3000SS Double Check Detector Assemblies", ES-A-3000SS, Date Unknown, 2 pages.

AMES, "Model 3000SS Double Check Detector Assembly", Date Unknown, 2 pages.

AMES, "Model 2000SE Double Detector Check Valve", Date Unknown, 4 pages.

AMCO, "Specification Sheet—H3200 Fire Hydrant Meter", Date Unknown, 2 Pages.

AMCO, "Industrial Compound Meters—Model C3000", Date Unknown, 2 Pages.

\* cited by examiner

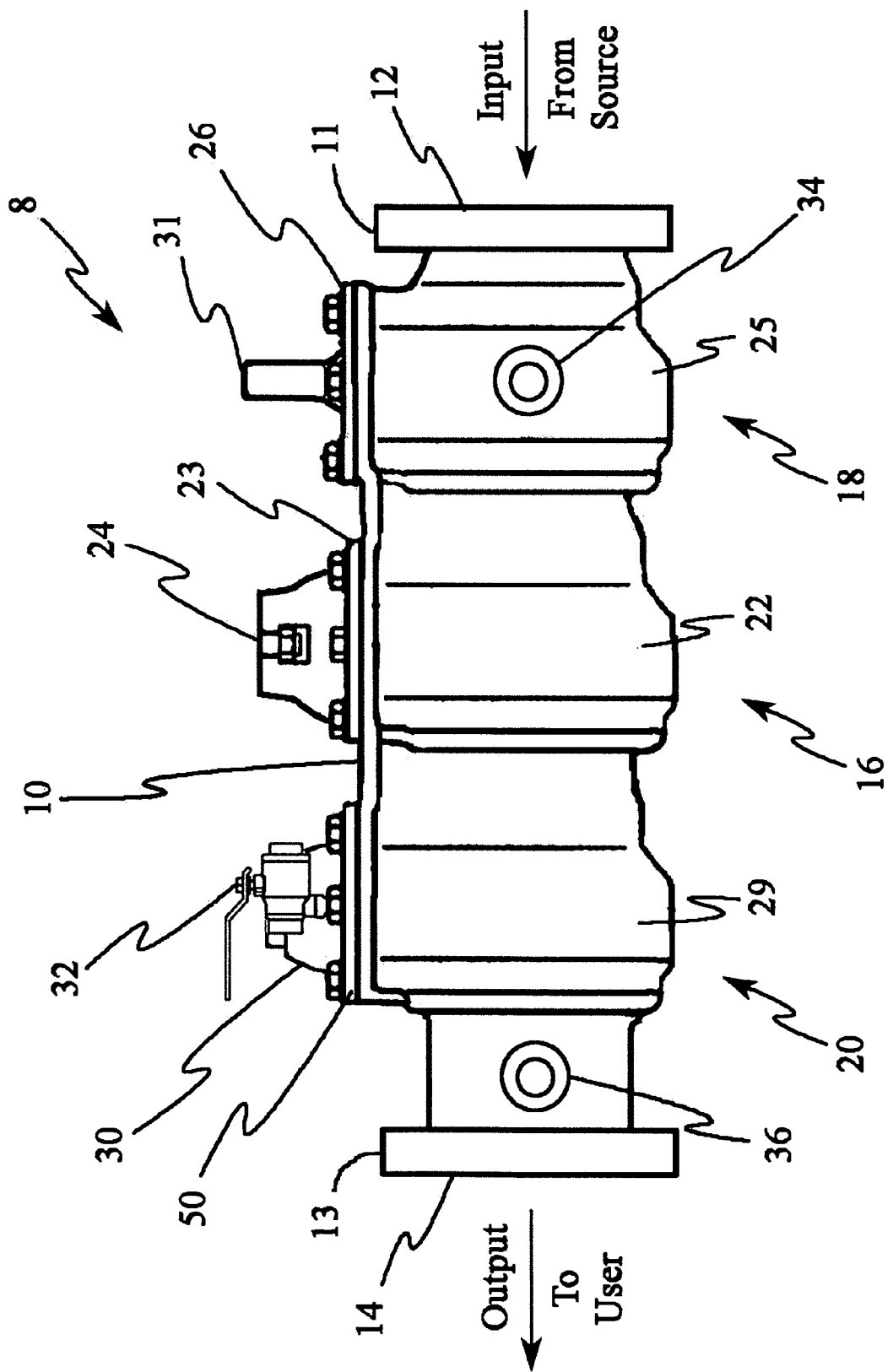

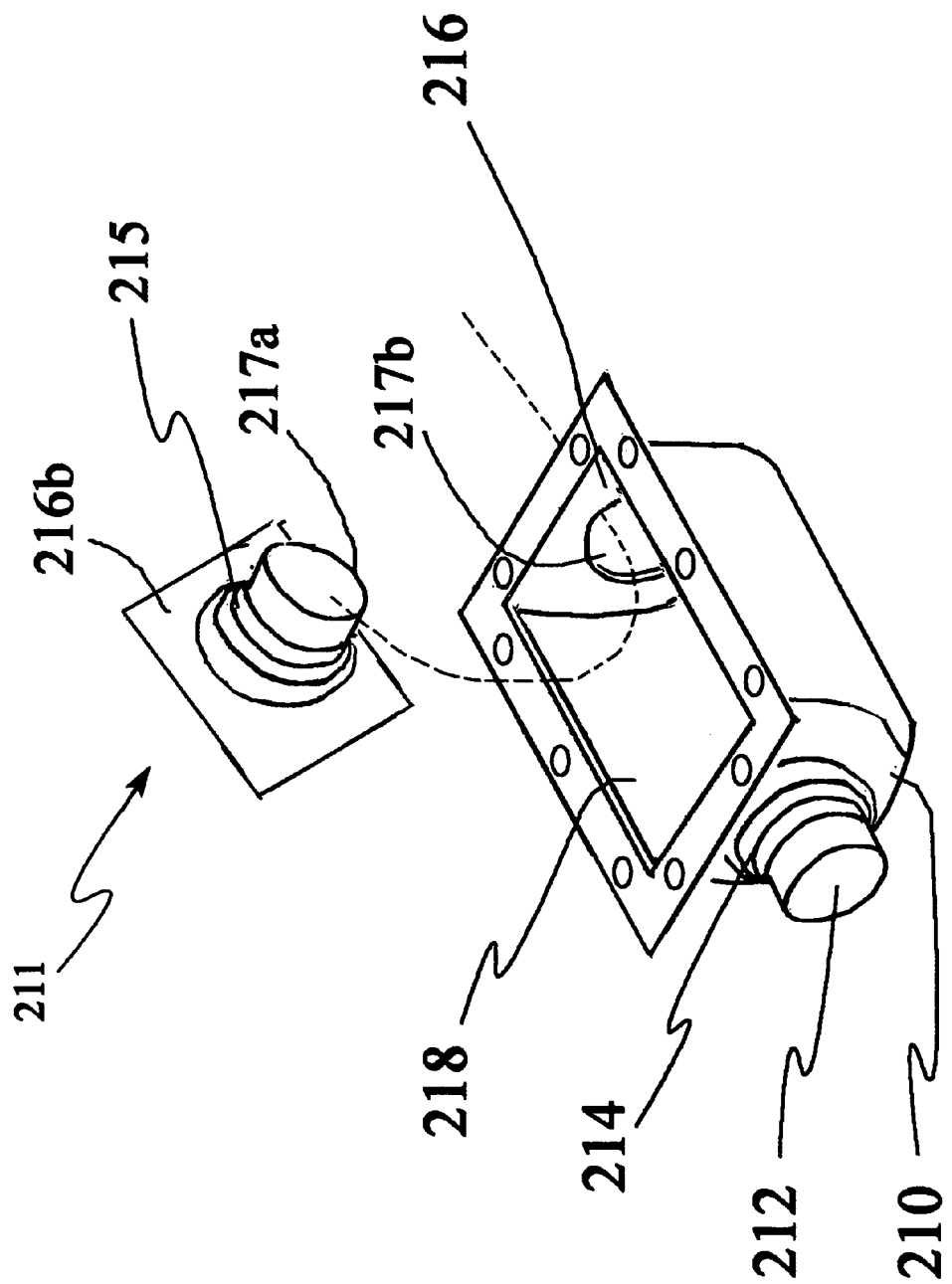

CHECK VALVE MODULE FOR FLOW METERS

TECHNICAL FIELD OF THE INVENTION

The present invention relates to improved check valve technology used in flow meters, improved flow meter design, and module inserts for upgrading used flow meters as well as for simplifying in new flow meter production.

BACKGROUND OF THE INVENTION

Flow meters are meters designed to measure the flow of a fluid/gas in a wide variety of applications. The most common types of meters presently used to meter fluid/gas flow are the positive displacement meter, the current meter (e.g. a turbine meter), and the compound meter.

Positive displacement flowmeters operate by repeatedly filling and emptying compartments of known volume with the liquid or gas from the flow stream. The flow rate calculation is based on the number of times these compartments are filled and emptied. Positive displacement meters are more accurate than current meters in low flow rates applications, and thus, are widely used to measure commodity consumption in municipal and industrial gas applications, municipal water applications, oil/refined fuel applications (e.g. the measurement of the transfer of refined fuels as well as the use of petroleum products) and industrial applications (e.g. the measure of liquids other than water or petroleum products in industrial and process plants which may include some water measurement for non-billing purposes).

In contrast, current meters (hereafter referred to as turbine meters) are used when the line sizes are larger and the flow volume is greater than can be handled by positive displacement meters. Turbine meters are most accurate in medium to high flow rate and high flow volume applications. Consequently, turbine meters are often used in the larger line sizes, especially those exceeding four inches.

Compound meters and Combo meters are more difficult to classify as they are actually a hybrid meter. Compound meters typically comprise both a positive displacement meter and a turbine meter. Compound meters are generally used to meter fluid flow in an installation where demand varies considerably between high demand and low demand. For example, municipal water utilities may use a compound meter to meter the water consumption of a large apartment complex, where water flow rates are generally high in the morning and evening while being much lower during the day (when most people are at work) and at night (when most people sleep). Such prior art meters are disclosed by Zellering in U.S. Pat. No. 5,698,781, by Bradham III, et al. in U.S. Pat. Nos. 4,100,799, and 4,175,434 and such patents are incorporated by this reference for all purposes.

As the name implies, a compound meter comprises two or more measuring chambers (typically two) in a single meter body. A low flow chamber housing a positive displacement meter (for example) may be used to measure fluid flow at low flow rates while a second high flow rate chamber housing a turbine meter may be used to measure fluid flow at higher flow rates. Similarly, a combo meter comprises two or more measuring chambers connected in parallel, typically in two different meter bodies. One measuring chamber is configured for a high flow rate while a second measuring chamber is configured for a relatively low flow rate. A check valve typically is placed in the high flow path of the turbine meter where such check valve is designed to open only when a predefined flow rate or pressure is achieved. When such check valve is closed, all fluid flow is diverted through the low flow chamber where the flow rate is measured by a low flow rate meter. If and when the fluid's flow rate reaches a predefined value, the check valve will open allowing fluid flow through the high flow chamber where the flow rate is measured by the turbine meter.

In many prior art compound meters, the check valve has been integrated into the water meter housing. These prior art check valves often comprise a "clapper" connected to pins and rollers that must be precisely calibrated so that the clapper mates against a seal (or seat) within the meter to prevent fluid flow until the predefined flow rate/pressure is achieved. Thus, if the rollers/pins in such prior art meter become worn to the point their operation (calibration) is affected, or the seal becomes worn to the point water leaks around the clapper when the check valve is closed, a compound meter will not accurately meter fluid flow rates. Indeed, when such compound meters are used as revenue meters by water utilities, such water utilities typically require annual testing of the check valve operation to verify that it is operating properly. Similarly, for some prior art meters, utilities require annual examination, and sometimes annual replacement, of the check valve seal.

The check valve assemblies and check valve seals in many prior art compound meters are very complicated to repair or replace. In some meters, to access a check valve, the heavy metal turbine chamber housing the compound meter must be removed from the fluid delivery system and the turbine metering element removed from the meter housing to get to the check valve components. In other meters, the repair person must disconnect the check valve side of the compound meter from the fluid delivery system and stick his hands inside the pipe, use tools to disconnect various parts of the check valve assembly, or perhaps the entire turbine meter, and remove the check valve assembly and perhaps the turbine meter. Such tasks require the ability to move heavy objects and must typically be performed in environments that are limited in space.

For the reasons described above, recalibration/replacement of a check valve assembly or inspecting/changing a check valve seal is often an arduous task requiring many hours to complete, and must typically be performed by trained personnel with the ability to move heavy objects. As a result, when repair or replacement of a check valve in prior art compound meter becomes necessary, many owners of such compound meters have found that scrapping a perfectly repairable compound meter is a better solution than investing the time and money required to repair the meter.

Therefore, there is a need for a compound meter having a check valve assembly module (1) that can easily be removed from the compound meter without having to remove the metering module, (2) that has few or no complicated rollers and pins that require calibration, (3) that requires little or no special training to remove, (4) that does not require the meter repairperson to move the relatively heavy compound meter, (5) that may comprise a seal as part of the check valve assembly simplifying seal inspection, removal and replacement; and (6) in which all meter components are secured in their respective chambers within meter using only external fasteners.

Another problem with prior art compound meters concerns safety issues related to testing the check valve for proper operation. As noted above, if the check valve in a compound meter is not working properly such compound meter will not meter flow rate accurately. Thus, many owners of compound meters require periodic (e.g. annual)

testing of the check valve. To facilitate testing of the check valve assembly, an access point to the fluid flowing through the check valve assembly is often provided. Such access point is located between the check valve and the meter output (i.e. on the customer side of the meter) and is normally terminated with a plug to seal the access point when not in use. When the check valve is to be tested, the plug is removed from the access point and test equipment attached to the access point to determine the pressure required to open the check valve. Notably, in compound water meters, the pressure the fluid exerts against the plug may be between 150 pounds/in$^2$ to 300 pounds/in$^2$. Therefore, the flow of fluid through the meter must be turned off before attaching the test equipment. Should the test personnel mistakenly remove the plug under pressure, however, the plug becomes a projectile capable of seriously injuring persons in the vicinity of the meter. Consequently, there is a need for a compound fluid meter that has built in test connections and pressure indicators that provide improved safety conditions for test personnel.

Still another problem that needs to be addressed relates to the complicated check valve assemblies associated with compound meters currently installed in metering applications. Such meters typically require annual testing, calibration and seal inspection. Examples of prior art compound/combo flow meters include Schwartz et al., U.S. Pat. No. 6,581,457, Kullmann et al., U.S. Pat. No. 4,429,571, Bradham, II et al., U.S. Pat. No. 4,100,799, Zellering et al., U.S. Pat. No. 5,698,781, and Schloetterer et al., U.S. Pat. No. 5,831,158 and such patents are incorporated by this reference for all that they disclose. As previously described, for many prior art compound/combo meters, when repair or replacement of a check valve becomes necessary, the owners of such compound/combo meters may find that scraping a perfectly repairable compound meter is a better solution than investing the time and money required to repair the meter. Consequently, there is a need for a check valve module that can be installed into existing meters thereby replacing the original check valve assembly that (1) can be easily removed from the compound meter without having to remove the metering module (2) has few or no complicated rollers and pins that require calibration, (3) requires little special training to remove, (4) does not require the meter repairperson to move relatively heavy objects such as the compound meter, and (5) may comprise a seal as part of the check valve assembly simplifying seal inspection, removal and replacement.

Yet another problem that needs to be addressed concerns prior art water meters that comprises components constructed of lead. Epidemiological studies reported by the Centers for Disease Control (CDC) note that harmful effects of lead in children can be observed at blood lead levels at least as low as 10 micrograms of lead per deciliter of blood (ug/dL). Notably, drinking water is one possible source of lead exposure. Consequently, actions have been taken by water utilities, government regulators, and manufacturers to minimize lead in drinking water.

While there are numerous possible sources of lead exposure, and while the relative contribution to total lead exposure from drinking water is typically low compared to other sources of lead exposure, water utilities are becoming increasingly sensitive to possible sources of lead contamination in their water system. Lead in drinking water is most commonly caused by corrosion of the water delivery system. Interior surfaces of faucets, fixtures, pipe, fittings, valves, solder used to join copper pipe, and water meters may be made of brass, bronze, or other materials that contain lead. For water distribution systems in general, and water meters specifically, during periods when water sits in a distribution system, lead may leach into the drinking water. Thus, water utilities have began requiring new water meters to be constructed of components that are substantially free of lead. However, millions of prior art water meters comprised of components containing significant amounts of lead are already installed in water distribution systems. Consequently, there is a need for an apparatus and method for cost effectively upgrading such prior art water meters with lead free components.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide an apparatus comprising a modular check valve for accurately metering fluid/gas flow in an installation where demand varies considerably.

Another general object of the present invention is to provide an improved check valve apparatus for use in new compound/combo meters and for upgrading existing meter installations that have complicated check valve assemblies.

Still another general object of the present invention is to provide a method and apparatus for safely testing the check valve module in a compound/combo meter.

Yet another general object of the present invention is to provide a compound/combo metering method and apparatus that is designed so that the check valve module can be removed from the metering apparatus without disturbing the metering element, without the need to lift relatively heavy objects, and without the need for removing fasteners internal to the meter housing.

Another object of the present invention is to provide an apparatus comprising a high flow metering element, a modular check valve, and a screen filter, each installed in their respective chambers and secured in said chambers with external fasteners such that any one component may be removed from the meter: (1) without disturbing the other two components, (2) by removing external fasteners only; and (3) from the top of their respective housing.

Another object of the present invention is to provide a self sealing check valve module for use in a compound meter.

Still a further object of the present invention relates to methodology for upgrading compound/combo meters having complicated check valve assemblies with a modular check valve.

Another general object of the present invention is to provide an apparatus comprised of substantially lead free components for cost effectively upgrading prior art water meters containing lead components.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

One exemplary embodiment of the present invention relates to novel implementations of check valve technology in a fluid/gas metering apparatus. The apparatus comprises a housing having a fluid input and a fluid output, wherein said housing is associated with a fluid source so that fluid enters said housing through the fluid input and exits said housing through the fluid output. The housing further comprises a first meter chamber for housing a first metering element disposed at least partially within the first meter chamber and detachably received thereby. The housing may further comprise a first meter chamber plate for at least partially enclosing said first metering element within the first meter chamber. The first metering element is configured to measure the flow of fluid through the first meter chamber.

The housing further comprises check valve chamber for housing a check valve module. The check valve chamber comprises a valve seat for receiving a check valve module seal. A check valve module comprising a check valve seal is at least partially disposed in the check valve chamber so that the check valve seal is received by the valve seat. The first meter chamber, and check valve chamber are suitably configured within the housing so that fluid flows through the first meter chamber when fluid flows through the check valve chamber. The housing may also comprise a check valve chamber plate that is detachably associated with the check valve chamber with fasteners external to the check valve chamber. When in place, the check valve chamber plate secures the check valve module within the check valve chamber.

Preferably, the check valve module is configured to open and permit fluid to flow through the check valve chamber when the pressure exerted on the input side of the check valve module by the fluid exceeds a predefined open pressure value. Similarly, the check valve module may be configured to prevent fluid from flowing through the check valve chamber when the pressure exerted on the input side of the check valve module by the fluid is below a predefined close pressure value.

For the preferred embodiment, the check valve module does not require calibration to set the predefined open and close pressure values after the module is installed into the said check valve chamber. It should be appreciated that the predefined open pressure value and predefined close pressure may or may not be the same value.

The first metering element may also be a self contained module having an integral chamber plate or a chamber plate that is separate from the self contained module where the chamber plate is suitable for at least partially enclosing the first metering element inside the first meter chamber. The chamber plate is detachably associated with the first meter chamber by fasteners external to the first meter chamber. Preferably the first metering element is a module that may be removable from the top of the first meter chamber.

The housing may further comprise a screen chamber positioned within the housing so that said fluid flows through said screen chamber before flowing through the first meter chamber. A screen element may be disposed in the screen chamber and configured to protect the first metering element from debris that might be present in the fluid/gas being metered. A screen chamber plate preferably detachably encloses the screen element inside the screen chamber. The screen plate may be further configured with a handle to assist removal of the plate. Additionally, the screen may be associated with the screen chamber plate so that the screen is removed when the screen chamber plate is removed, preferably from the top of the screen chamber. The screen chamber may also comprise a screen chamber input (SC-input) a High Flow Screen Chamber output (HFSC-output) and a Low Flow Screen Chamber Output (LFSC-output).

The screen within the screen chamber may comprise a high flow screen, a low flow screen and a universal screen. Such screens may be separate components within the screen chamber or one integral component.

The housing also preferably comprises a test port and an auxiliary port. The test port is in fluid communication with the fluid on the output side of the check valve module. The auxiliary port is in fluid communication with the test port and is preferably positioned on the check valve chamber plate wherein the check valve module has at least one fluid path to permit fluid flow from the output side of the check valve chamber to the auxiliary port. The auxiliary fluid port may be configured with a pressure measure device for providing an indication of the fluidic pressure at the test port. The auxiliary port may also be configured with a shutoff valve having at least one output.

The test port may also be integral with the check valve module. For this embodiment, the check valve module comprises a valve portion and a stem portion. The stem portion extends outwardly from the valve portion to a distal end. The check valve module may be positioned within the check valve chamber so that the distal end extends outside the check valve chamber thereby making the distal end a test port. Alternatively, the distal end may terminate inside the check valve chamber and be in fluid communication with a test port integral with the check valve chamber plate. The distal end may be associated with an end cap that provides a water tight seal when the test port is not in use. Such end cap may be a pressure measure device or may be associated with a pressure measure device to provide an indication of the fluidic pressure at the test port.

For compound or combo meter configurations, the housing further comprises a second meter enclosure having a sme-input (sme—Second Meter Enclosure) and a sme-output. A second metering element is disposed within the second meter enclosure and is detachably received thereby. A second meter enclosure plate detachably encloses the second metering element at least partially within said second meter enclosure. The main housing further comprises a bypass port positioned between the check valve chamber and the fluid output. The sme-input is associated with the LFSC-output and the sme-output is associated with the bypass port. In this configuration, fluid flows into the meter input, through said LFSC-output, into said sme-input, through said second meter enclosure, out said sme-output, through said bypass port, and back into the main housing. The second metering element is configured to measure the flow of fluid through the second meter enclosure. It will be appreciated that the main housing may comprise a two LFSC-output ports and two bypass ports, one on each side of the main housing, so that the bypass arm may be installed on either side of the housing.

Yet another exemplary embodiment of the present invention relates to a test ready check valve module for use in fluid meters configured with a valve enclosure having a fluid input port, a fluid output port, and a valve seat. The valve seat is position on the output side of the valve enclosure. The test ready check valve module comprises a valve portion positioned within the valve enclosure between the fluid input port and said fluid output port. The valve portion comprises a seal on the output side of the valve portion that is configured to be inserted into the valve seat for making a water tight seal around the valve portion.

The valve portion may further comprise a flapper associated with a spring such that the spring biases the flapper closed to prevent fluid flow from the fluid input port to the fluid output port until the fluidic pressure at said fluid input port reaches a predefined value (at least partially determined by the spring constant). The check valve is secured in place within the check valve enclosure by a check valve plate configured to detachably attach to the check valve enclosure using fasteners external to the check valve enclosure.

The test ready check valve module may further comprise a stem portion extending outwardly from said valve portion and terminating at the distal end of the stem portion. The stem portion comprises a fluid path configured to permit fluid from said fluid output port to flow to the distal end of said stem portion. A test port is in fluid communication with the fluid at the distal end of the stem portion.

Still another embodiment of the present invention relates to an apparatus for measuring flow of a commodity. The apparatus comprises a housing configured with a screen chamber, a meter chamber, a valve chamber, a housing input port, and a housing output port. The housing is configured to be connected to a commodity delivery system so that said commodity flows into the housing input port and to the input of the screen chamber, flows through the screen chamber and to the input of the meter chamber, flows through the meter chamber and to the input of the valve chamber, flows through the valve chamber and to the housing output port.

A first metering element is disposed at least partially within said meter chamber and is detachably received thereby. A meter chamber plate may be used to enclose the first metering element within said meter chamber. The meter chamber plate is attached to the housing with external fasteners. The first metering element is configured to measure the rate of flow of said commodity through the meter chamber;

The valve chamber is configured for receiving a check valve module. The valve chamber further comprises a valve seat configured for receiving a valve seal. A valve, having an input side and an output side, is disposed within the valve chamber. The valve is configured with a valve seal suitably arranged so that the vale seal is receive by the valve seat when the valve is disposed within the valve chamber. A valve chamber plate for securing the valve within the vale chamber is detachably attached to the valve chamber with fasteners external to the valve chamber.

The valve is configured to permit the commodity to flow through the valve chamber when the pressure exerted on the input side of the valve by said commodity exceeds a predefined open pressure value. Similarly, the valve is configured to prevent the commodity from flowing through the valve chamber when the pressure exerted on the input side of the valve by said commodity is below a predefined close pressure value.

The apparatus may further comprise at least one screen element disposed within the screen chamber and detachably received thereby. The screen element is positioned within said screen chamber so that the commodity must flow through the screen element before flowing out of the screen chamber. A screen chamber plate detachably encloses said screen element inside the screen chamber.

With the above configuration, the meter element may be removed from the housing by removing only external fasteners from the meter chamber plate and without disturbing the valve. Similarly, the valve is removable from said housing by removing only external fasteners from the valve chamber plate and without disturbing the meter.

Additional embodiments of the present subject matter involves methodology for modifying compound/combo meters comprising relatively complicated check valve assemblies by replacing such assemblies with a check valve module. The method comprises the steps of obtaining a compound meter comprising a housing, said housing comprising a main chamber for housing at least one meter element, a secondary chamber for housing a check valve assembly, and a flapper-valve-seat. The check valve assembly may be comprised of multiple components including a flapper in fluid communication with said flapper-valve-seat. The check valve assembly components are removed from the secondary chamber and an appropriately sized check valve module comprising aspects of the present inventions is inserted into the chamber. The check valve module is preferably configured with a seat adapter such that when the check valve is inserted into the secondary chamber, the seat adapter is received by the secondary chamber thereby forming a seal between the check valve module and the secondary chamber.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 1 is a side view of a fluid meter (8) comprising a one piece housing incorporating various aspects of the present invention;

FIG. 16b is a side perspective view of a module insert and a port seal adapter;

Figure 2A:
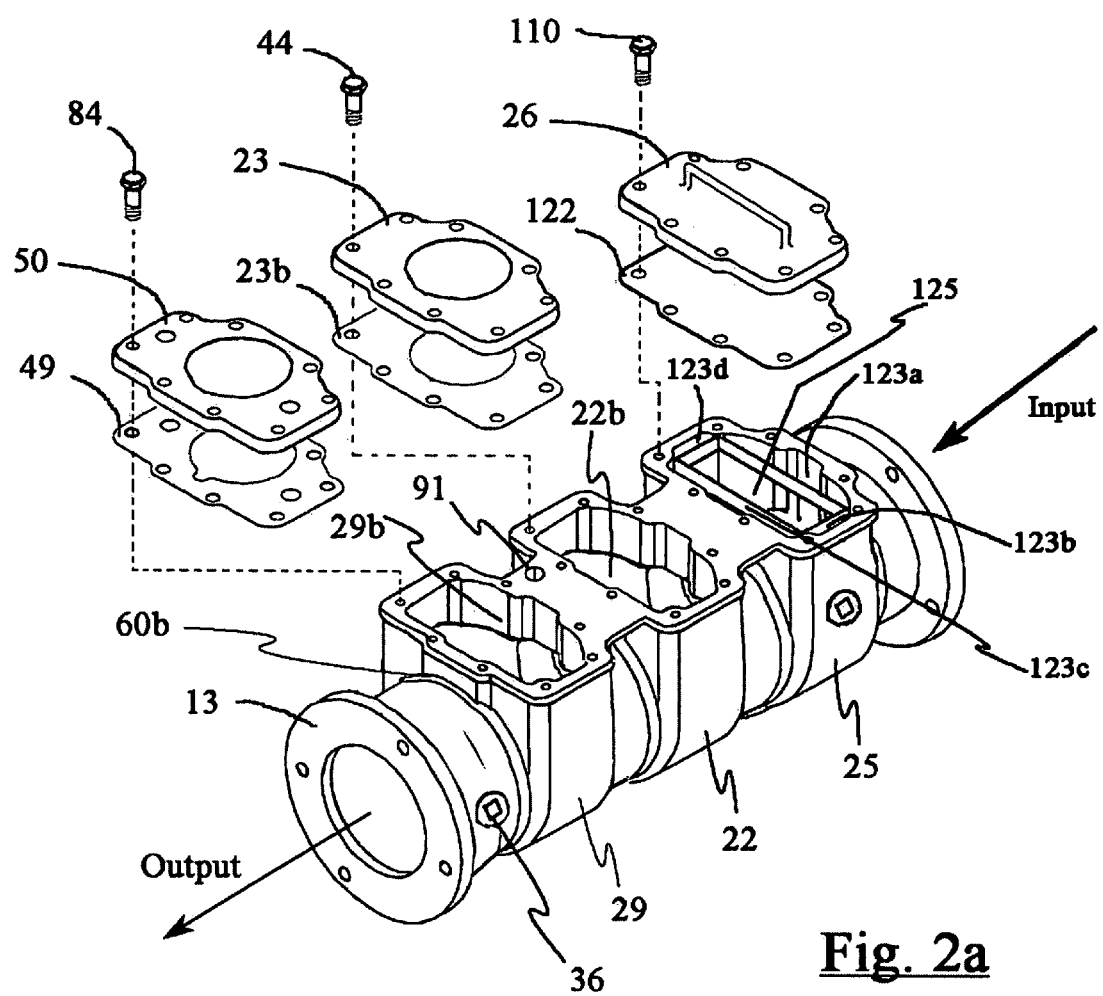
FIG. 2a is a top perspective view of a fluid meter housing showing one embodiment of the various chambers and top plates.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

While the particulars of the present invention and associated technology may be adapted for use in flow meters and utility meters metering the consumption of commodities such as gas, water, oil, etc., the examples discussed herein are primarily in the context of water consumption. In addition, for the purposes of this document, a gas is also a fluid.

FIG. 1 is a side view of a fluid meter (8) comprising a one piece housing incorporating various aspects of the present invention. The exemplary fluid meter (8) comprises a housing (10) with a fluid input (12) and a fluid output (14). The fluid input side of housing (10) includes integral flange (11) and the fluid output side includes integral flange (13). Such flanges (11, 13) may be used for associating housing (10) with a fluid delivery system (not shown) so that fluid from a fluid source enters housing (10) through the fluid input (12) and exits housing (10) through the fluid output (14).

As shown in FIG. 1, housing (10) further comprises a meter section (16), a check valve section (20), and a screen section (18). Meter section (16) comprises first meter chamber (22) and check valve section (20) comprises check valve chamber (29). Meter section (16) and check valve section (29) are positioned within housing (10) so that fluid from fluid input (12) flows through the first meter chamber (22) when fluid flows through check valve chamber (29).

Figure 2B:
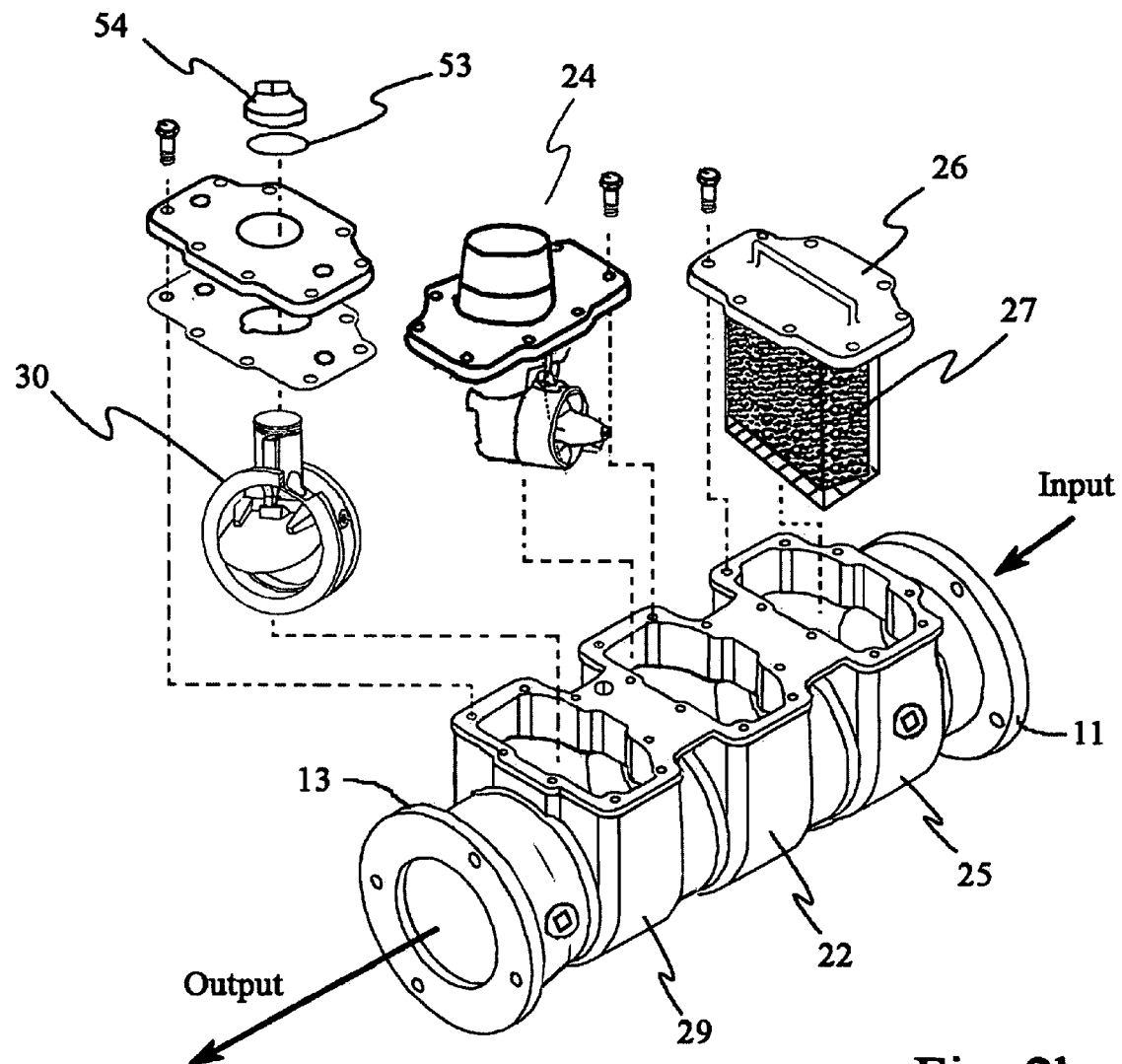
FIG. 2b is an exploded perspective view of a fluid meter comprising a screen section, a metering section, and a check valve section.

Screen section (18) includes a screen chamber (25) for housing a screen (27, FIG. 2b). As shown in FIG. 1, screen section (18) is positioned in housing (10) between fluid input (12) and meter section (16). Screen (27) is disposed within screen chamber (25) and is detachably enclosed within screen chamber (25) by screen chamber plate (26). Screen chamber (25) and screen (27) will be described more fully later in this document.

FIG. 2a is a top perspective view of a fluid meter housing comprising one embodiment of the various chambers and top plates. FIG. 2a shows housing (10) comprising an empty screen chamber (25), first meter chamber (22), and check valve chamber (29). A screen chamber plate (26) detachably attaches to housing (10) with bolts (110), a first meter chamber plate (23) detachably attaches to housing (10) with bolts (44), and a check valve chamber plate (50) detachably attaches to housing (10) with bolts (84). For this embodiment of housing (10) each chamber plate is configured to enclose and secure a device within each respective chamber using external bolts. It should be noted that any suitable external fastener/device for holding objects or parts together may be used to attach the various plates to housing (10).

The FIG. 1 and FIG. 2a depict embodiments of the present invention comprising the various chambers formed in a single integral housing while the various chamber plates are separate components. It will be appreciated that, for some embodiments of the invention, some or all of such chamber plates may in be formed into one integral component without departing from the scope of the invention. For example, first meter chamber plate (23) and check valve chamber plate (50) may be integrated into a single chamber plate. Conversely, meter section (16), check valve section (20), and the screen section (18) may be separate components connected together to form a fluid meter.

Additionally, while FIG. 1 shows check valve section (20) positioned in housing (10) between meter section (16) and fluid output (14), one of ordinary skill in the art will appreciate that such order could be reversed without departing from the scope of the present invention. Indeed, the positioning of the various metering chambers should be selected to comply with any applicable metering standards for the environment in which the meter will be installed.

FIG. 2b is a top perspective exploded view of a fluid meter comprising a screen section (18), a meter section (22), and a check valve section (20). Such sections will be described in more detail below. It should be noted that bolts (44, 84, 110) may be any suitable fastener for detachably attaching a chamber plate to a chamber. Additionally, a chamber plate may be attached, at least partially, to a chamber using a fastener such as a hinge (or other similar device).

Figure 3:
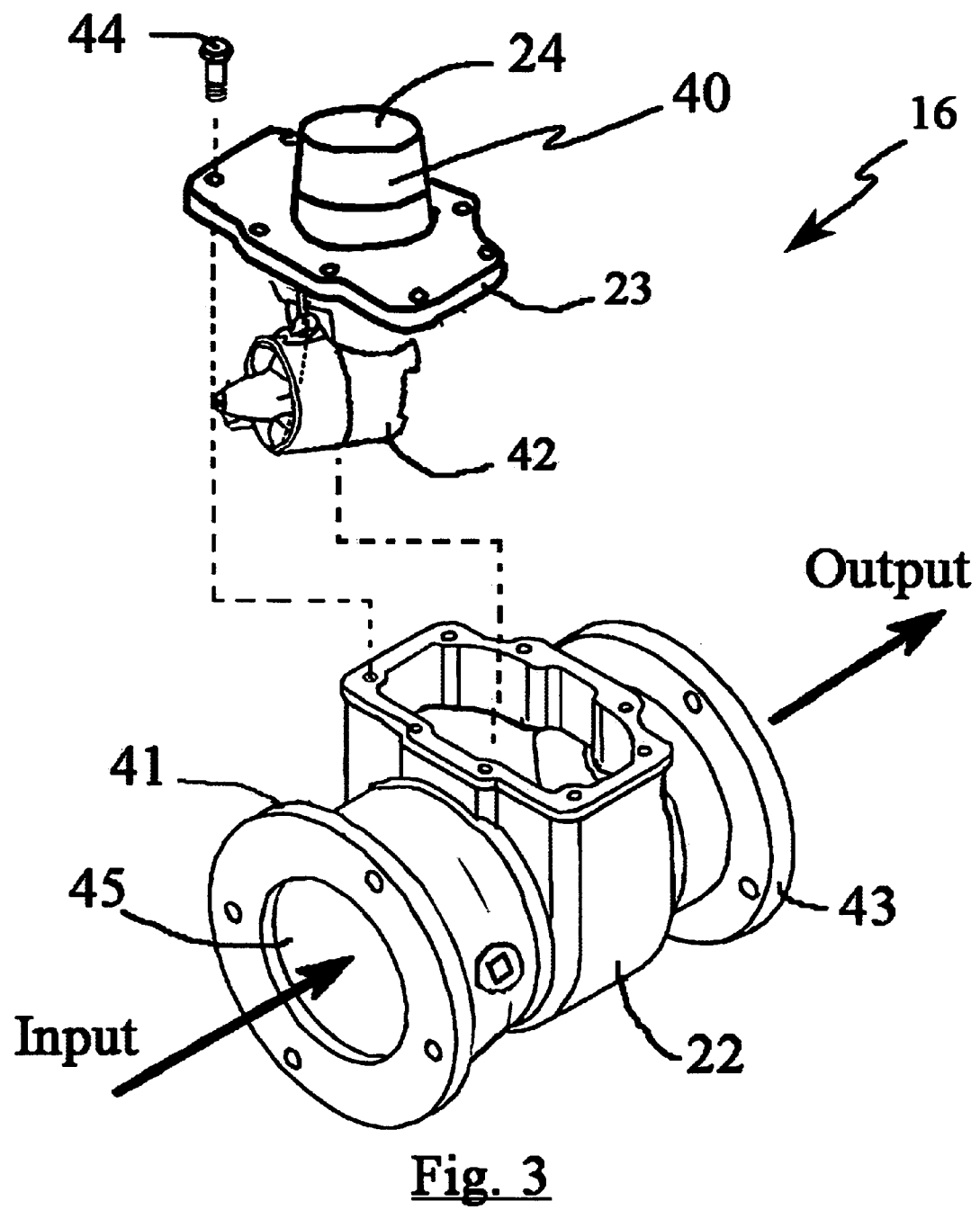
FIG. 3 is an exploded perspective view of an exemplary meter section comprising an exemplary first metering element chamber and first metering element.

Referring now to FIG. 3, an exploded perspective view of an exemplary meter section (16) comprising a first meter chamber (22) and first metering element (24). In FIG. 3, meter section (16) is depicted as a separate component that may be associated with other sections of fluid meter (8) using input flange (41) and output flange (43). Fluid enters meter section (16) through the input (45) and exits meter section (16) through the output. First metering element (23) comprises register (40) and flow detector (42). For the preferred embodiment, flow detector (42) converts the kinetic energy of the fluid flowing through the chamber into a measurable movement that may be associated with the flow rate of the fluid flowing through the first meter chamber (22). Register (40) is coupled to flow detector (42) and documents the measurable movement in any suitable manner for the meters intended purpose.

As shown in FIG. 3, first metering element (24), when installed in the first meter chamber (22), is disposed at least partially within first meter chamber (22) so that the flow detector (42) is suspended in first meter chamber (22) and in the flow path of the fluid flowing through the chamber. For this embodiment, at least part of register (40) extends through first meter chamber plate (23). The first metering element (24) is secured within first meter chamber (22) by a first meter chamber plate (23) that is detachably connected to first meter chamber (22) with bolts (44) or some other suitable fastener. In the preferred embodiment, first metering element (24) is a self contained module with an integral chamber plate. It should be appreciated, however, that first meter chamber plate (23) may be a separate component without departing from the scope and spirit of the present invention. As shown in FIG. 3, the first meter element may be removed from the top of first meter chamber (22) as a single component after removing external bolts (44). One of ordinary skill in the art will understand that such a configuration greatly simplifies removal of the metering element from the fluid meter.

First metering element (24) may be any type of high flow meter, preferably a turbine style meter. Examples of suitable turbine meters include the high performance turbine meters manufactured by Neptune®. Other suitable high flow metering technology is disclosed by Zellering in U.S. Pat. No. 5,698,781 and Schwartz et al. in U.S. Pat. No. 6,581,457 and such patents are incorporated by this reference for all that they disclose. Such technology is known and understood by those skilled in the art, and a detailed explanation thereof is not necessary for purposes of describing the method and system according to the present invention.

Figure 4:
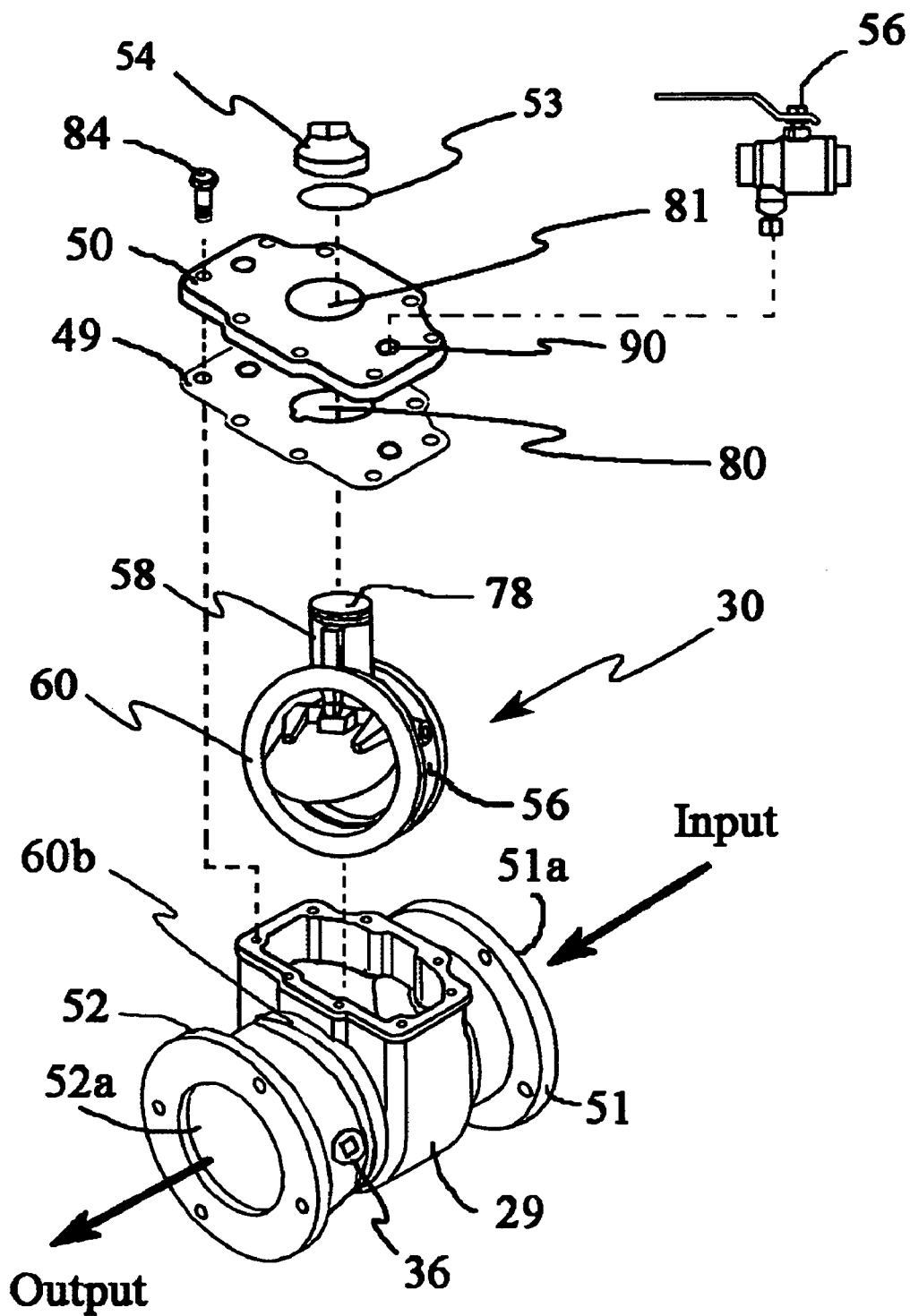
FIG. 4 is an exploded perspective view of an exemplary check valve section comprising a check valve chamber, check valve, check valve chamber plate, a top cap, and a shutoff valve.

Referring now to FIG. 4, an exploded perspective view of an exemplary check valve section comprising a check valve chamber (29), check valve module (30), check valve chamber plate (50), a top cap (54), and a shutoff valve (56) is presented. In FIG. 4, check valve section (20) is depicted as a separate component that may be associated with other sections of fluid meter (8) using input flange (51a) and output flange (52a). Fluid enters check valve section (20) through the input (51a) and exits check valve section (20) through the output (52a). Check valve chamber (29) also comprises a valve seat (60b) configured for receiving a check valve seal.

Check valve module (30) is inserted into check valve chamber (29) between the input (51a) and the output (52a) and is configurable for preventing fluid flow through the chamber. Check valve module (30) is preferably a single piece module removable from the top of check valve chamber (29) as shown in FIG. 4. However, it will be appreciated that check valve module (30) may comprise a plurality of cooperatively associated component parts that are not shown independently. Check valve module (30) may further comprise seal (60) that is in fluid communication with the check valve seat (60b) of check valve chamber (29). Seal (60) is configured to prevent fluid from the input side of the check valve module (30) from flowing around the check valve module to the fluid output port. In the preferred embodiment, seal (60) and valve seat (60b) are configured so that the seal slides into the valve seat about ¾ of an inch. Such a configuration forms a self sealing check valve module that allows for quick and easy visual inspection of the check valve seal upon removing the check valve from the check valve chamber.

Figure 6:
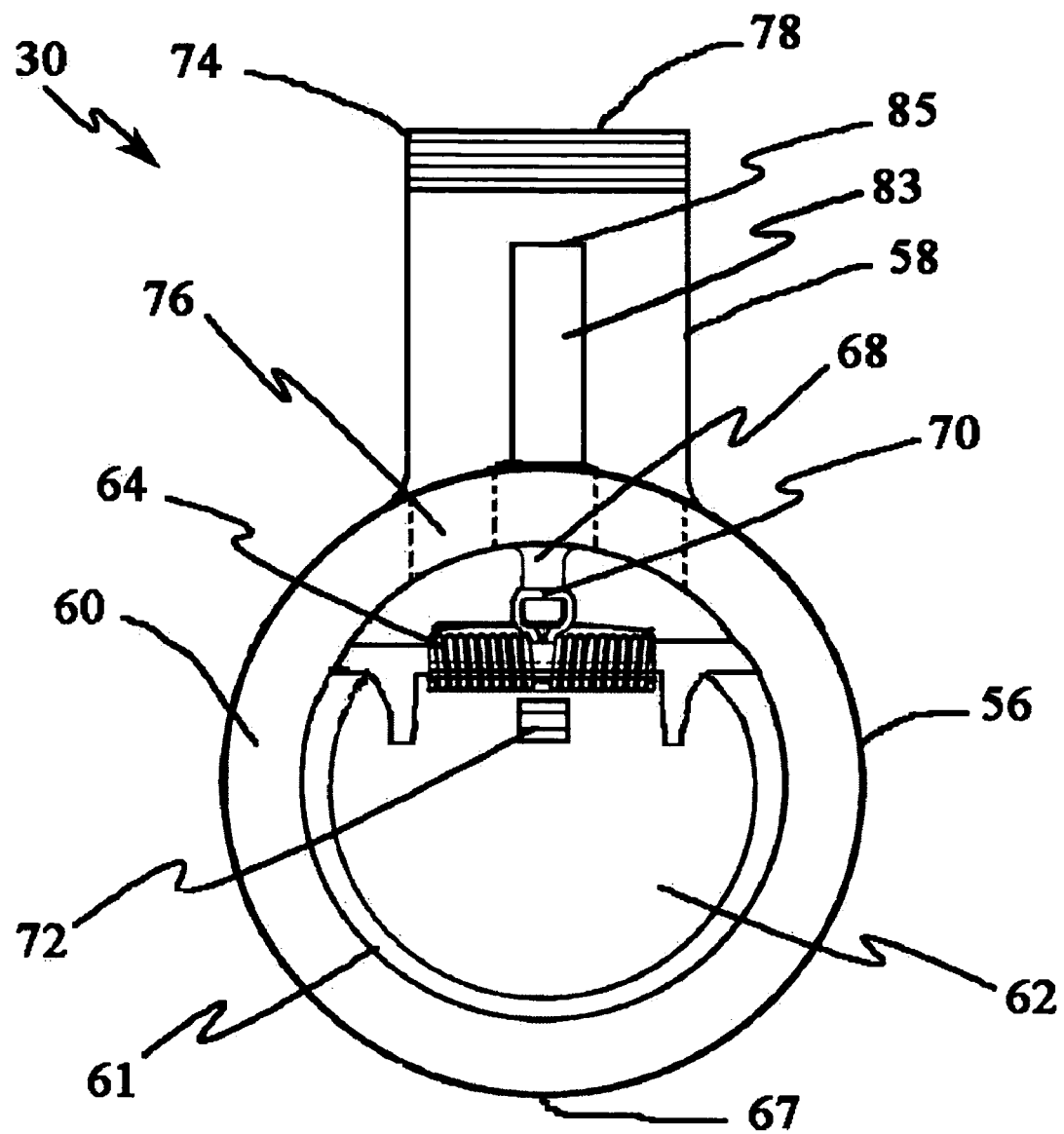
FIG. 6 is side view of the output side of exemplary check valve module (30)
Figure 7:
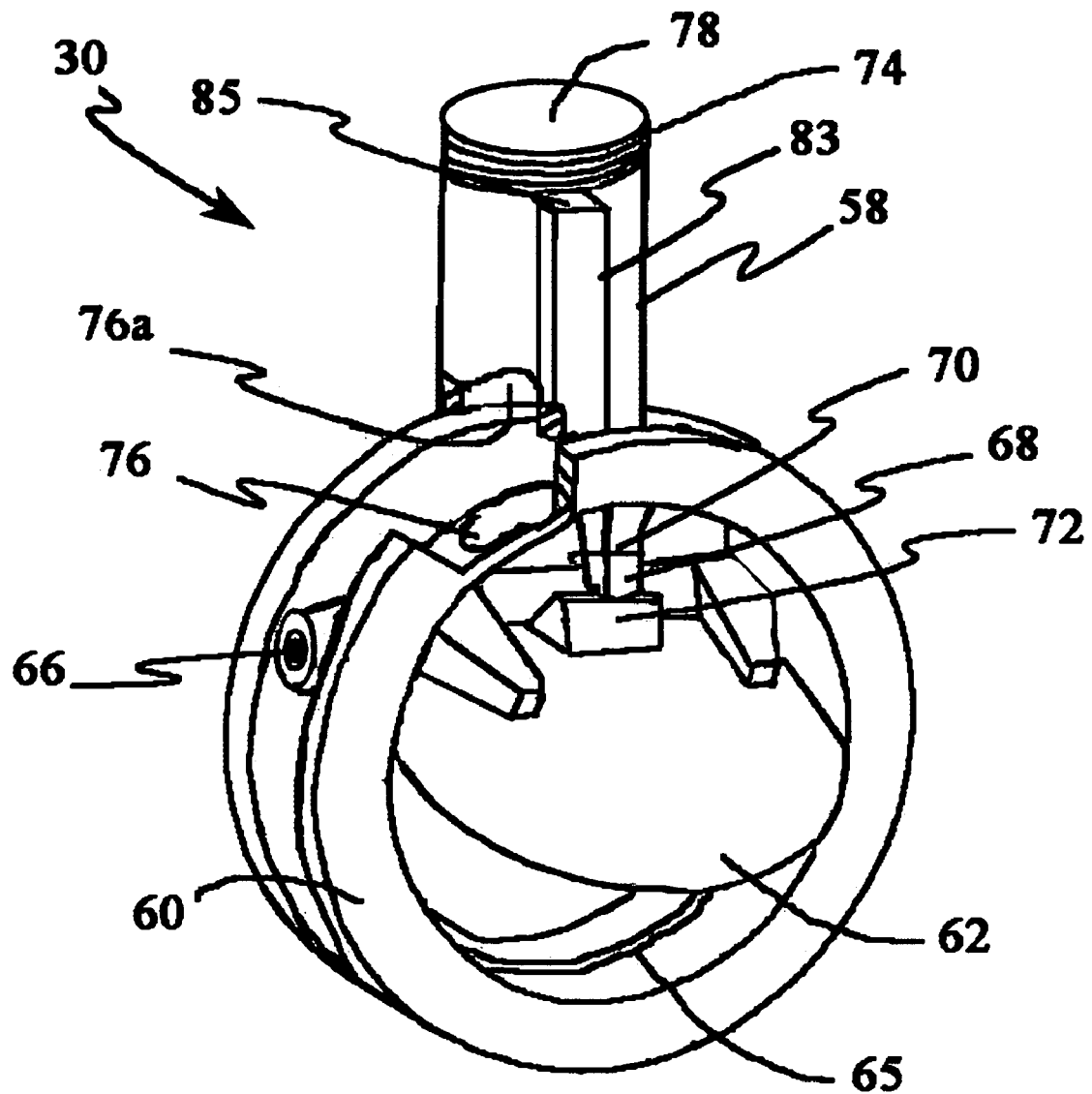
FIG. 7 is a side perspective view of the check valve in FIG. 6 with a cut away section revealing a fluid path.

FIG. 6 depicts an output side view of check valve module (30). In FIG. 6, check valve module (30) is comprised of a valve portion (56) and a stem portion (58). Valve portion (56) further comprises clapper (62) associate with coil spring (64). Spring (64) is oriented horizontally relative to the bottom (67) of check valve module (30). A rod (66, FIG. 7) extends through the coil formed by spring (64) and attaches to the interior sides of valve section (56). The center section of spring (64) comprises a leverage point (70) that extends around post (68) thereby creating a bias torque on clapper (62) that tends to force clapper (62) in the closed position. Referring now to FIG. 7, as flapper (62) opens and rotates about rod (66), flapper stop (72) is brought into contact with post (68) thereby stopping the rotation of flapper (62).

As one of ordinary skill in the art will appreciated, when the fluidic pressure on the input side of check valve module (30) becomes a predefined value greater than the fluidic pressure on the output side of check valve module (30), clapper (62) pivots about rod (66) and the check valve opens allowing fluid flow through check valve chamber (29). This in turn allows fluid to flow through the first meter chamber (22) where such fluid flow is metered by first metering element (24). For one preferred embodiment of meter (8), check valve module (30) is configurable to open and permit fluid to flow through check valve chamber (29) when the pressure exerted on the input side of the check valve module (30) by the fluid in check valve section (20) reaches/exceeds a predefined open pressure value. The pressure at which the check valve will open will be approximately equal to (1) the fluidic pressure on the output side of check valve module, plus, (2) the pressure required to overcome the spring (64) bias torque, plus (3) friction losses. For a given friction loss and a given pressure differential between the check valve input and output, one of ordinary skill in the art will appreciate that the predefined pressure at which the check valve opens is determined by the bias torque generated by spring (64) (i.e. the spring constant).

Similarly, check valve module (30) is preferably configurable to prevent the fluid from flowing through the check valve chamber when the pressure exerted on the input side of the check valve module is below a predefined close pressure value. It should be noted that for the purposes of this document, the pressure exerted on check valve module (30) may also be referred to as the fluidic pressure.

The check valve configuration shown in FIG. 6 may be configured so that the predefined open pressure value and the predefined close pressure value are the same. In addition, such values may be different values by providing a closing friction or damping action to the flapper (62). A flapper (62) configured with closing friction technology will provide hysteresis that will minimize the tendency of the flapper (62) to "chatter" when the fluidic pressure in the check valve chamber "hovers" around the predefined open pressure value. Similarly, a flapper (62) configured with damping technology will reduce the response time of flapper (62) to a point that minimizes the tendency of the flapper (62) to chatter.

Preferably, check valve module (30) does not require calibration of the open and close values after the module is assembled by the manufacture. Alternatively, a means for calibrating check valve module (30) may be provided; however, for such an embodiment, no calibration should be required after the module is installed into check valve chamber (29).

It should be noted that while the check valve module (30) of FIG. 4 comprises one horizontal spring, it will be appreciated that two or more springs may be used. Additionally, one or more vertical springs may be used in conjunction with one or more flappers that open sideways about a vertical post. Indeed, many other spring and flapper configurations may be used without departing from the scope of the present invention.

As noted above, and referring to FIG. 4 and FIG. 6, check valve module (30) is comprised of a valve portion (56) and a stem portion (58). As shown in FIG. 6, stem portion (58) is attached to the valve portion (56) at one end and extends outwardly from the valve portion and terminates at a distal end (74) located at the free end of the stem portion (58). Check valve module (30) is positioned within check valve chamber (29) so that stem portion (58) extends through a hole in the check valve chamber plate (50) to the outside of the check valve chamber (29). Stem portion (58) may further comprise at least one fluid path (76, FIG. 6) that permits fluid from the output side of the check valve to flow to the distal end (74) thereby forming a test port (78). Since test port (78) is in fluid communication the output side of the check valve, test port (78) provides external access to the fluid on the output side of meter (8), and thus, may be used by meter technicians for testing purposes. More specifically, such technicians may connect test equipment to test port (78) to test the pressure at which the check valve opens and closes. A stem top cap (54) and o-ring (53) may be associated with test port (78) when test port (78) is not in use. Stem top cap (54) may further comprise a pressure indication device for providing an indication of the fluidic pressure at the test port thereby providing a visual warning to test technicians.

For the embodiment shown in FIG. 4, stem portion (58) extends through a hole (80) in gasket (49) and through hole (81) in check valve chamber plate (50) to a point outside of the check valve chamber (29). Therefore, with the exception of distal end (74), check valve module (30) is enclosed inside check valve chamber (29) and detachably secured therein by bolts (84) or some other suitable apparatus. In addition, check valve module (30) may be further secured in place inside check valve chamber (29) at least partially by the pressure exerted on surface (85) (FIG. 6 and FIG. 7) of post (83) by gasket (49) and check valve chamber plate (50). Post (83) may be spring loaded so that it may be compressed vertically down stem portion (58) to allow for manufacturing tolerances. Check valve module (30) may be further secured in place inside check valve chamber (29) at least partially by the interaction of valve seal (60) with valve seat (60b). As noted above, the valve seal (60) slides into valve seat (60b) about ¾ of an inch. Such a valve seal/valve seat configuration prevents vertical movement while the check valve chamber plate (50) prevents horizontal movement. Additionally, for embodiments where the valve seat (60b) is on the output side of the check valve chamber (29) and the valve seal is on the output side of the check valve module (30), the flow of water between the fluid source and the customer tends to improve the sealing affect.

Figure 5A:
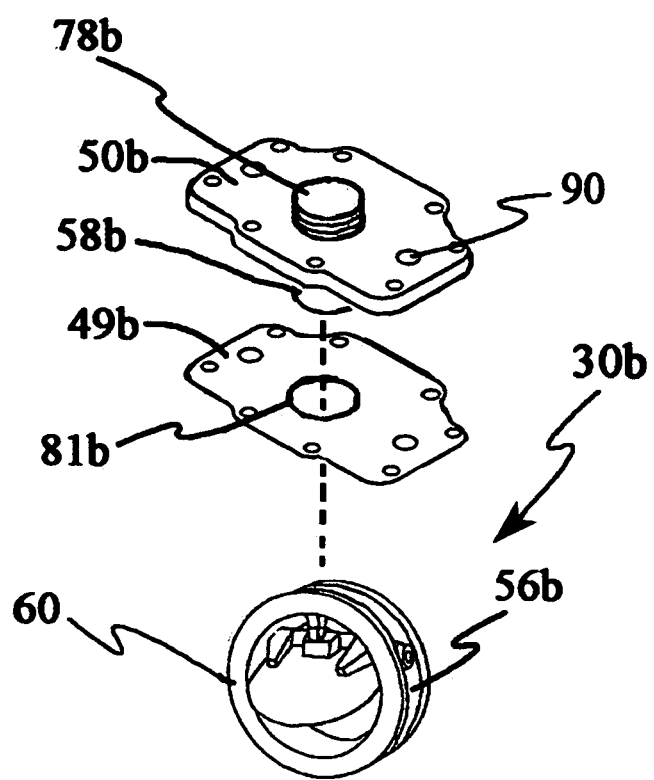
FIG. 5a presents a perspective view of one alternative embodiment of a check valve module.

For the embodiment shown in FIG. 5a, check valve module (30b) comprises only a valve portion (56b). Check valve chamber plate (50b) may comprises a stem (58b) that extends through hole (81b) in gasket (49b) that presses against and helps secure check valve module (30b) inside check valve chamber (29). Valve portion (56b) may comprise fluid paths that allow fluid from the output side of the check valve chamber (29) to flow to the test port (78b). Similarly, the check valve may also comprise fluid paths that allow fluid from the input side of the check valve to flow to a test port. It will also be appreciated that conduits or channels may be provided as necessary for channeling fluid through the fluid paths and maintaining a barrier between the check valve input and the check valve output.

Figure 5B:
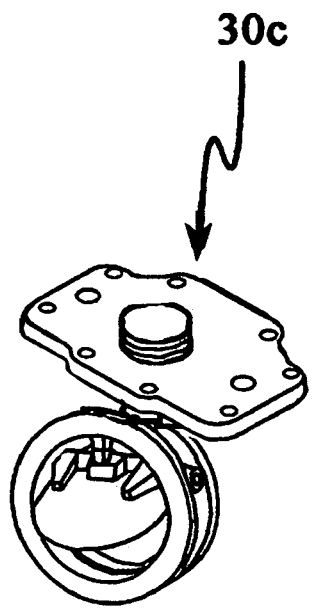
FIG. 5b presents a perspective view of another alternative embodiment of a check valve module.

As shown in FIG. 5b, check valve chamber plate (50, 50b) may also be integral to the check valve module. For example, check valve chamber plate (50b), gasket (49b), stem (58b), and valve portion (56b) may be formed from as one integral component; check valve (30c).

As mentioned previously, the pressure the fluid exerts against stem top cap (54) may be between 150 pounds/in$^2$ to 300 pounds/in$^2$. Therefore, the flow of fluid through the meter must be turned off before attaching the test equipment to test port (78). Should the test personnel mistakenly remove stem top cap (54) under pressure the cap becomes a projectile capable of seriously injuring persons in the vicinity of the meter. To help prevent such an occurrence, top cap (54) may be associated with a pressure indication device. Alternatively, an auxiliary fluid port may be provided that is in fluid communication with test port (78) and associated with a pressure indication device.

Figure 8:
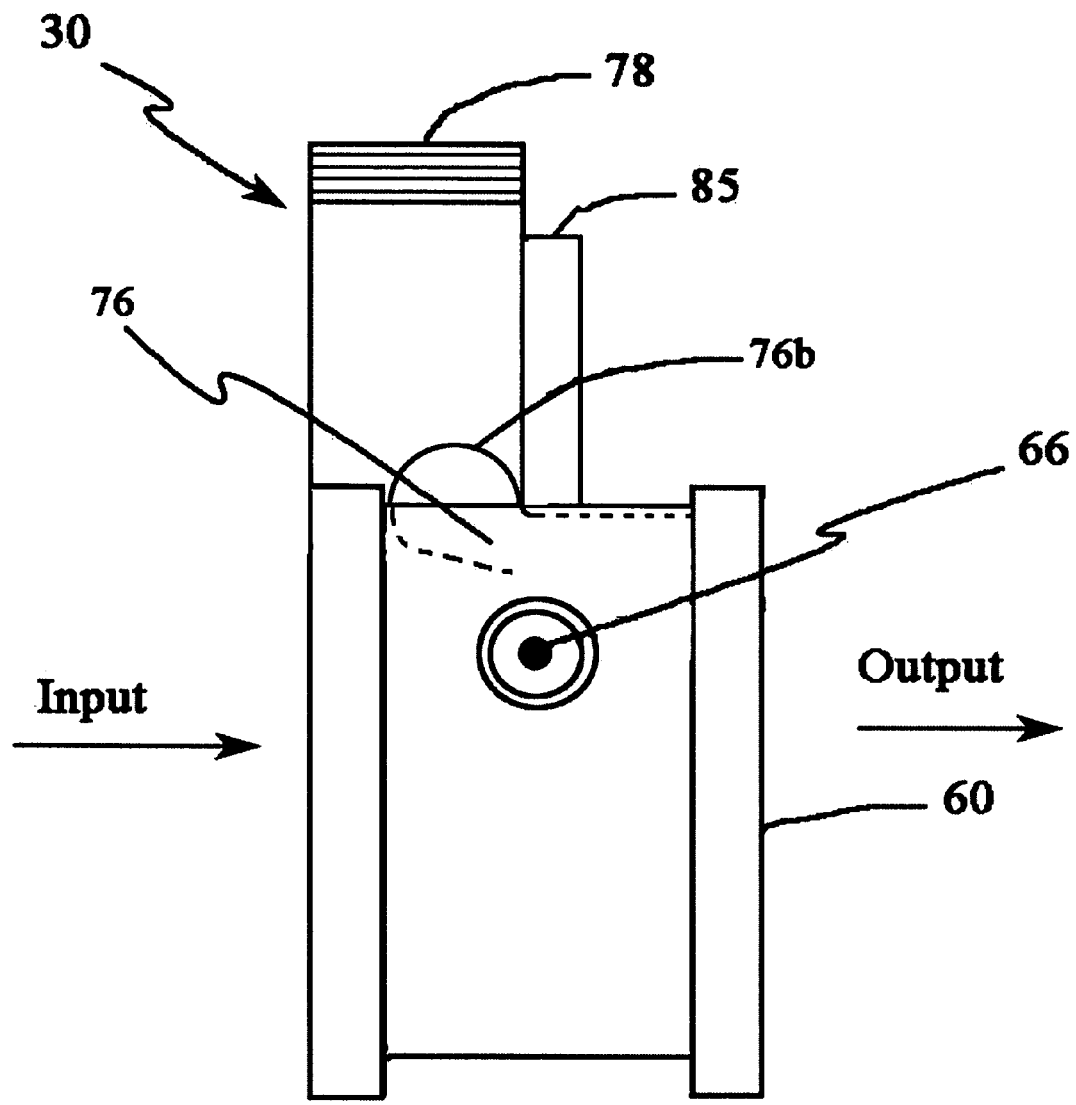
FIG. 8 is a side view of check valve module (30) comprising a fluid path.

As shown in FIG. 4 and FIG. 5, check valve chamber plate (50, 50b) further comprise an auxiliary fluid port (90) in fluid communication with test port (78, 78b). It should be appreciated however, that auxiliary fluid port (90) could be located at any location along meter (8) as long as auxiliary fluid port (90) is in fluid communication with the test port (78, 78b). FIG. 7 shows a side perspective view of the check valve module (30) with a cut away section revealing fluid paths (76, 76a). In this example, fluid path (76) and (76a) provide a conduit between the distal end of stem portion (58) and the output side of check valve chamber (29). Fluid path (76b, FIG. 8) places the distal end of stem portion (58) in fluid communication with and auxiliary fluid port (90). FIG. 8 shows a side view of check valve module (30) showing fluid path (76) and fluid path (76b). Fluid path (76) allows fluid from the output side of check valve module (30) to flow to distal end (74). Additionally, flow path (76) is in fluid communication with flow path (76b) thereby allowing fluid from the output side of check valve module (30) to flow to auxiliary port (90) located on check valve chamber plate (50) or anywhere on the output side of the meter. It should be appreciated that since seal (60) is located on the output side of the embodiment of check valve (30) shown in FIG. 8, a conduit between fluid path (76b) and auxiliary fluid port (90) may also be supplied when necessary to maintain the barrier between the fluid at the check valve input and the fluid at the check valve output.

A pressure measure device (not shown) may be coupled to auxiliary fluid port (90) to provide an indication of the fluidic pressure at auxiliary port (90) and test port (78). The pressure measure device may be a simple binary pressure indicator, a low cost pressure gauge, or any other suitable pressure measurement device that will provide an indication of pressure at auxiliary port (90). Such technology is known and understood by those skilled in the art, and a detailed explanation thereof is not necessary for purposes of describing the method and system according to the present invention.

Figure 9:
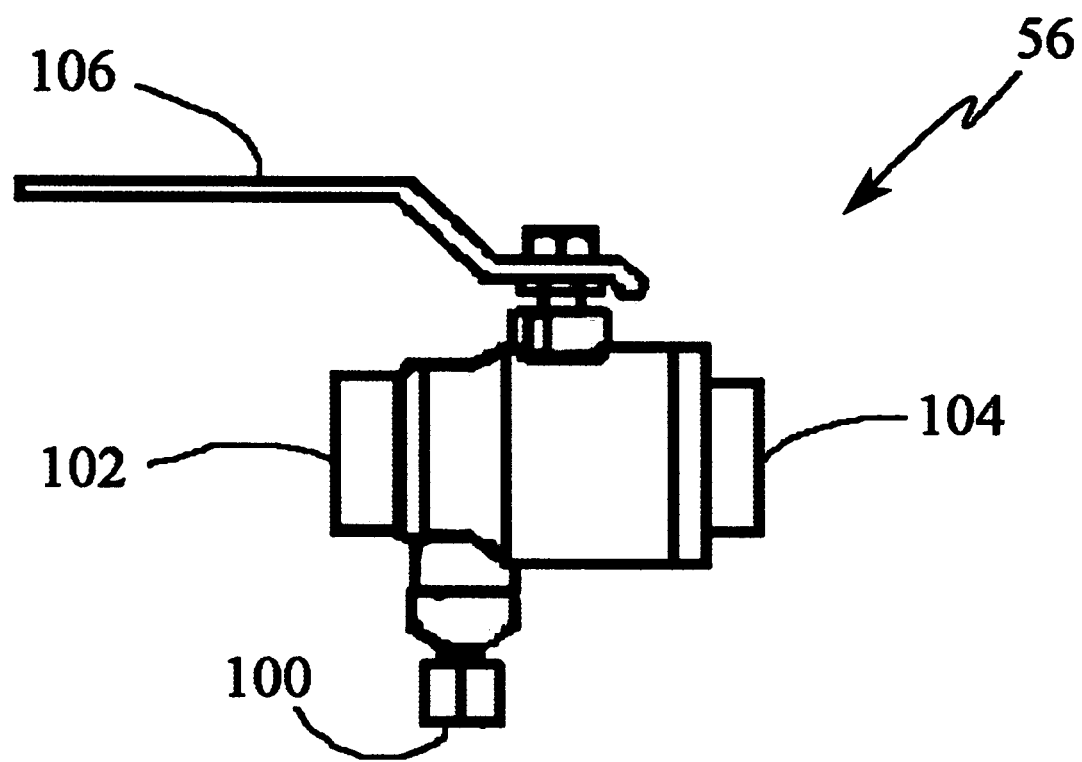
FIG. 9 is a side view of an exemplary shutoff valve.

Referring now to FIG. 9, a side view of an exemplary shutoff valve is presented. Shutoff valve (56) may be coupled to auxiliary port (90), which should be substantially equal to the fluid pressure at test port (78). Shutoff valve (56) comprises a shutoff valve input (100), a shutoff element (106), and at least one shutoff valve output (102, 104). Shutoff valve (56) is configured to permit fluid flow from the shutoff valve input (100) to a shutoff valve output (102, 104) when said shutoff element (106) is in the open position. Similarly, shutoff valve (56) is configured to prevent fluid flow from the shutoff valve input (100) to a shutoff valve output (102, 104) when the shutoff element (106) is in the closed position. For this embodiment, a pressure measurement device may be coupled to one of the shutoff valve outputs while leaving the remaining shutoff valve outputs free for other purposes. Additionally, quick disconnects may be fitted to shutoff valve outputs (102, 104) to facilitate easy connections to the shutoff valve outputs.

Figure 10:
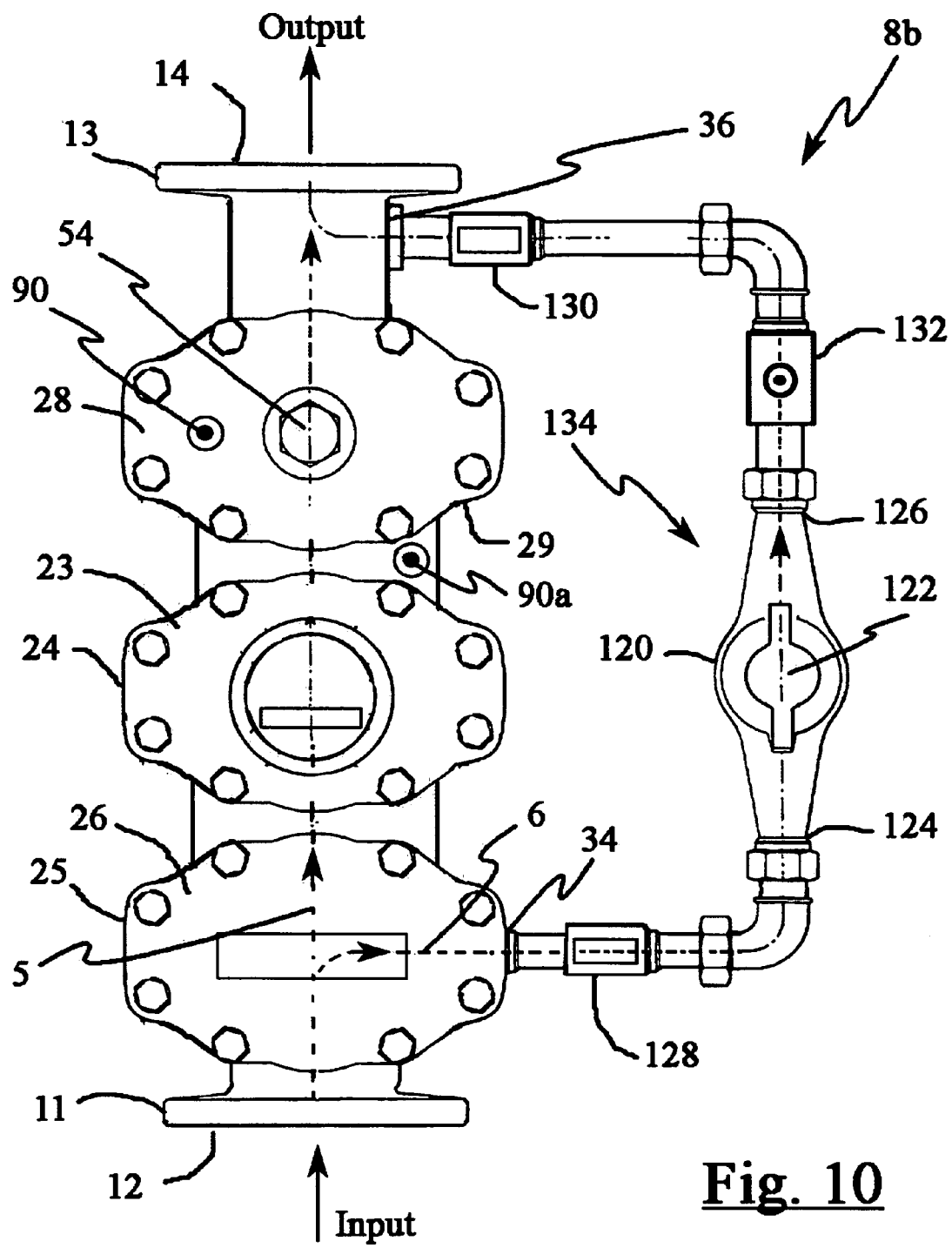
FIG. 10 is a top view of a exemplary combo meter (8b) comprising a high flow section and a low flow section.

With reference to FIG. 10, an exemplary combo meter (8b) comprising a high flow section and a low flow section and incorporating various aspects of the invention are now considered. It will be appreciated that while a combo meter is used for this embodiment, a compound meter may be used without departing from the scope of the present invention. As shown in FIG. 1, meter (8) comprises Low Flow Screen Chamber Output (LFSCO-port) (34) and bypass port (36). As shown in FIG. 10, fluid from the fluid source enters meter (8b) at fluid input (12) and then takes one of two possible paths (fluid path (5) or fluid path (6)) through the meter. Fluid path (5) is a high flow rate fluid path where fluid passed through screen chamber (25), first meter chamber (22), check valve chamber (29) and exits the meter through fluid output (14). Fluid path (6) is a low flow rate fluid path where fluid exits the screen chamber through LFSCO port (34) and flows through bypass arm (134).

More specifically, following fluid path (6), fluid from a fluid source flows into meter (8b) at fluid input (12), and enters screen chamber (25). At least some of the fluid exits screen chamber (25) through LFSCO port (34) and flows into second meter enclosure (120) through the sme-input (124) (sme—Second Meter Enclosure). The fluid flows through the second meter enclosure (120) and exits through sme-output (126). The fluid continues to flow along fluid path (6) to bypass port (36) where the fluid reenters the high flow fluid path (5).

A second metering element (122) is at least partially disposed within second meter enclosure (120) and is detachably enclosed therein by a second meter enclosure plate by bolts or some other suitable device. Second metering element (122) is configured to measure low flows relative to the flow rate of fluid path (5). Second metering element (122) may be based on any type of technology including nutating discs, positive displacement technology, multi jet, single jet, oscillating technology, piston based technology, or any suitable technology that operates by repeatedly filling and emptying compartments of known volume with the liquid or gas from a flow stream. Typically, the flow rate is calculated based on the number of times these compartments are filled and emptied. Examples of low flow metering technology is disclosed by Hamilton et al. in U.S. Pat. No. 6,604,434 and such patent is incorporated by this reference for all that it discloses. Such technology is known and understood by those skilled in the art, and a detailed explanation thereof is not necessary for purposes of describing the method and system according to the present invention.

Bypass arm (134) may further comprise shutoff valve (128) and shutoff valve (130) that may be used to stop the flow of fluid along fluid path (6). Additionally, meter (8b) may further comprise check valve (132) installed in the bypass arm (134) to prevent the back flow of fluid along fluid path (6).

It should be appreciated by one of ordinary skill in the art that when check valve module (30) is closed, little or no fluid should be flowing along high flow path (5), but fluid continues to flow along low flow path (6). After check valve module (30) opens, fluid preferably flows along both the high flow path (5) and the low flow path (6).

Figure 11:
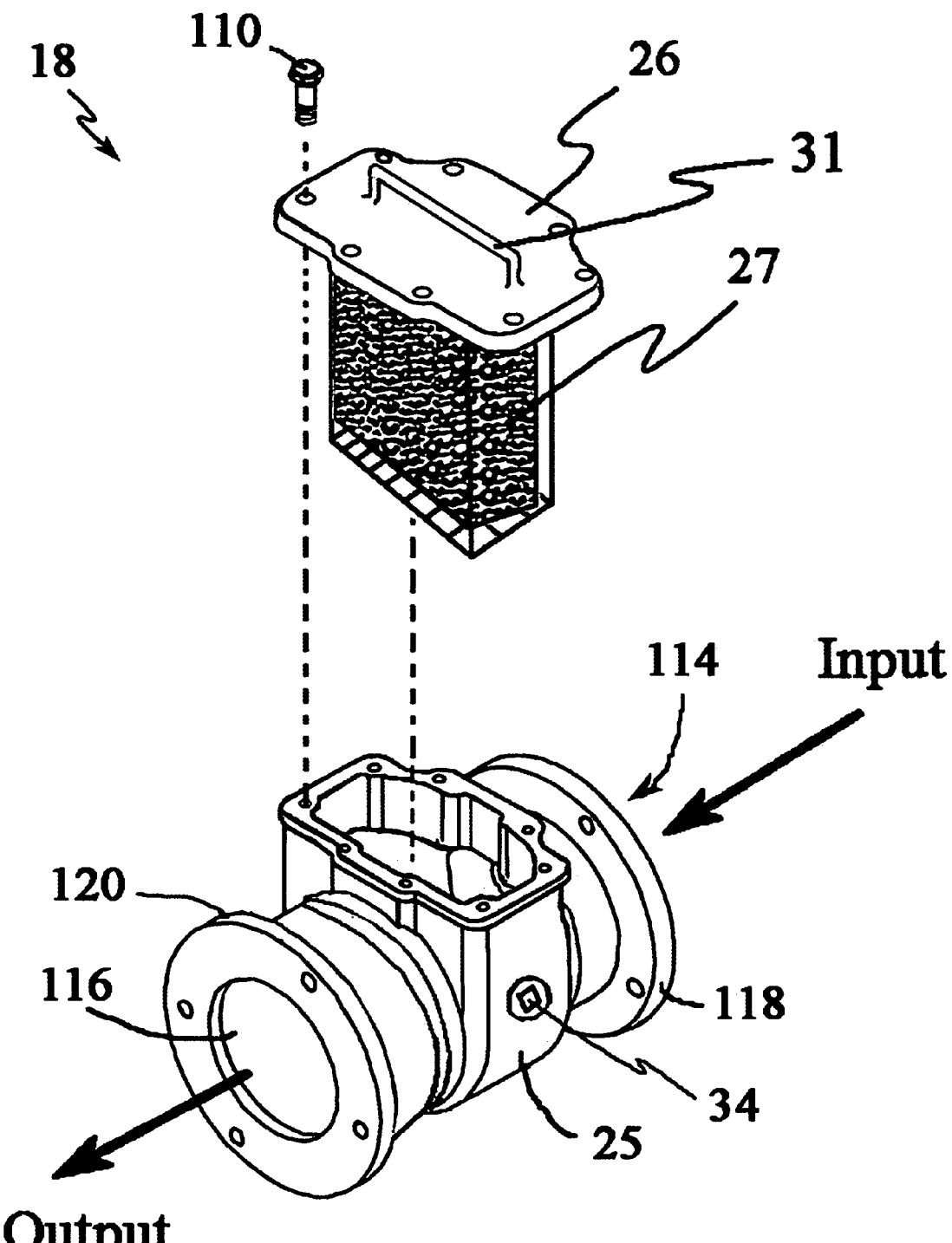
FIG. 11 is an exploded perspective view of screen section (18)

With reference to FIG. 11, screen section (18) is now considered in more detail. Screen section (18) comprises screen chamber (25) for housing a screen element (27). Screen section (18) is positioned in housing (10) between fluid input (12) and meter section (16). When screen section (18) is a separate component as shown in FIG. 11, screen chamber (25) may further comprise input flange (118) and output flange (120). Fluid from the fluid source flows into the fluid input (114) of screen chamber (25) and may exit screen chamber (25) through a HFSCO port (116) (High Flow Screen Chamber Output port) and/or a LFSCO port (34). HFSCO port (116) is preferably associated with the high flow input of meter section (16) and LFSCO port (34) is preferably associated with the low flow input of second meter enclosure (120).

Screen element (27) is disposed within screen chamber (25) and is detachably enclosed therein by screen chamber plate (26) using bolts (110) or any other suitable device. Screen section (18) may further comprise a gasket (122, FIG. 2a) to provide an improved seal between screen chamber plate (26) and screen chamber (25). Screen (27) is positioned with screen chamber (25) so that the fluid flowing though the screen chamber passes through screen element (27). Such a configuration performs a filtering function that cleans debris from the fluid supplied by the fluid source that might otherwise result in clogging of meter (8) or otherwise interfere with proper metering functions.

Figure 12:
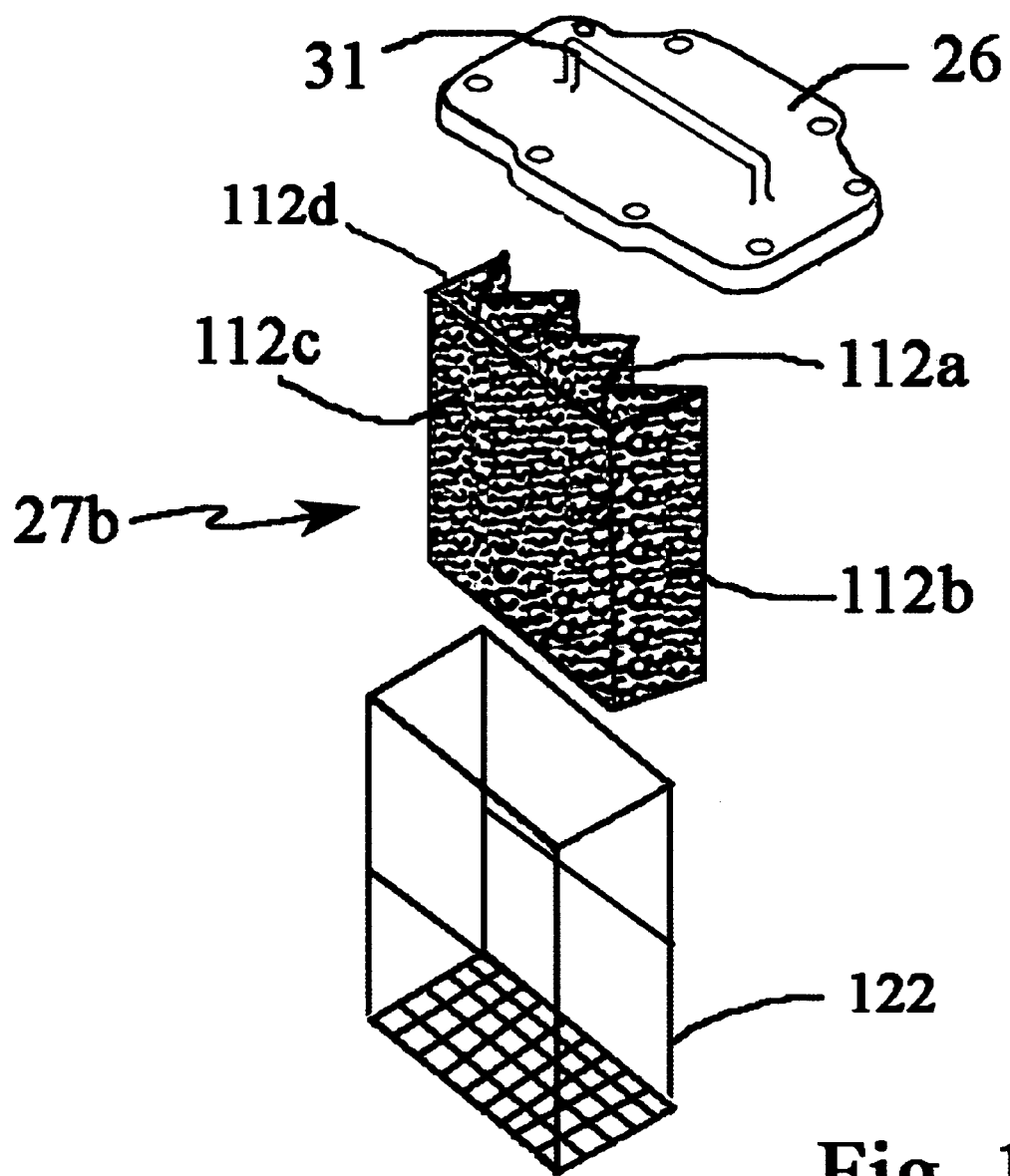
FIG. 12 is an exploded view showing an exemplary screen cage, screen element, and screen chamber plate.

FIG. 12 shows an exploded view of an exemplary screen cage (122), screen element (27b), and screen chamber plate (26). Screen element (27b) may be of any suitable configuration for filtering debris from the fluid. Screen element (27b) is one possible embodiment of a screen element comprising four screen screening surfaces (112a, 112b, 112c, 112d) that may be configured to provide a double screening function for fluid flowing through both the HFSCO port (116) and LFSCO port (34). Screen surface (112a) is a Z-screen configuration designed for universal filtration of the fluid coming from the fluid input of the screen chamber. Screen surface (112c) is preferably configured for high flow rate filtration for filtering fluid exiting screen chamber (18) through the HFSCO port (116). Screen surface (112c) and (112d) are preferably configured for low flow rate filtration for filtering fluid exiting screen chamber (25) through LFSCO port (34). It should be noted that a LFSCO port may be present on both sides of screen chamber (25). Such a configuration provides for attaching bypass arm (134) to either side of meter (8).

Additionally, screen surfaces (112a), (112b), (112c), and (112d) may each be constructed in a manner to provide for an improved streamline fluid flow at the outputs of screen chamber (25). For example, it is well known that flow turbulence at the input of a high flow meter may result in metering errors. For compound/combo meters, the junction between the high flow fluid path and the low flow fluid path may produce flow turbulence in the high flow current path. Such turbulent flow can result in meter registration errors (which may be especially problematic at the crossover point) if present at the input of the high flow meter. To provide a more steady streamline flow of fluid into meter section (16), screen surface (112c) of screen element (27b) may be constructed in a grid like pattern (other patterns may be used as well) that "realigns" the water and produces a more steady streamline flow of fluid through the HFSCO port (116).

Additionally, as shown in FIG. 2a, the interior of a screen chamber (25) may comprise four perimeter slot sections (123a, 123b, 123c, 123d) defining a central void (125) in the middle of the screen chamber. Screen element (27b) may be inserted in central void (125) with additional screen surfaces inserted in the perimeter slots. Perimeter slots (123a–123d) may also be configured to receive flow restrictors to limit the flow of fluid through the meter and prevent over loading (over speeding) the metering elements that would otherwise result in erroneous metering data. One type of flow resistor technology is a simple plate that diminishes the size of the pipe orifice allowing only a fixed amount of water to pass regardless of the amount of pressure in the pipe. Such A restrictor plate will suppress the flow capacity of the meter and protect such meter from over speeding when water throughput flows to atmosphere (for example). Flow restrictor technology is well known and understood by those skilled in the art, and a detailed explanation thereof is not necessary for purposes of describing the method and system according to the present invention.

Figure 13:
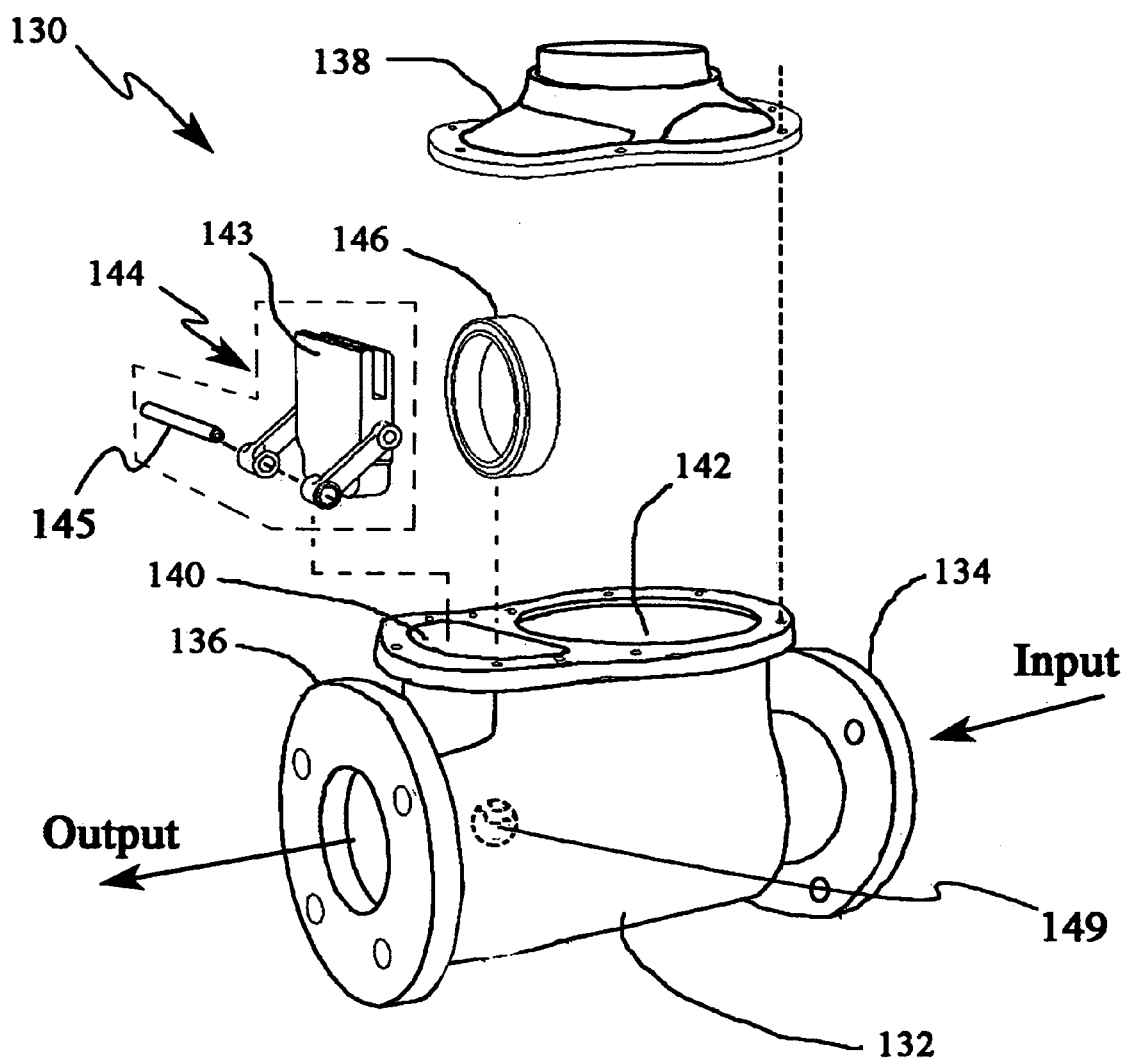
FIG. 13 is an exploded view of a prior art compound meter comprising a multiple piece check valve assembly.

Methodologies for exchanging a multi piece check valve assembly in a compound meter with a single piece check valve module is now considered. Referring to FIG. 13, a prior art compound meter (130) is shown. Compound meter (130) comprises a housing (132) comprising a main chamber (142), a secondary chamber (140) and a top plate (138). Main chamber (142) houses at least one meter element (not shown) and a secondary chamber (140) houses check valve assembly (144). The check valve assembly (144) consists of multiple components including a flapper (143) and a flapper shaft (145). The secondary chamber (140) is associated with a flapper-valve-seat (146) and flapper-shaft-receivers (149). Flapper-valve-seat (146) is in fluid communication with flapper (143). Flapper-shaft-receivers (149) are configured to receive flapper shaft (145) to help support the flapper (143) in the secondary chamber. On example of such a compound meter is the SRH compound meter manufactured by SENSUS® Metering Systems.

The method of exchanging the above described multiple piece check valve assembly with a check valve module includes the step of obtaining a compound meter having the above described configuration. If top cap (138) is present, it is removed. Next, check valve assembly (144) is removed from the secondary chamber. The flapper-valve-seat is then removed the secondary chamber along with any components required to facilitate the removal of the flapper-valve-seat.

Figure 14:
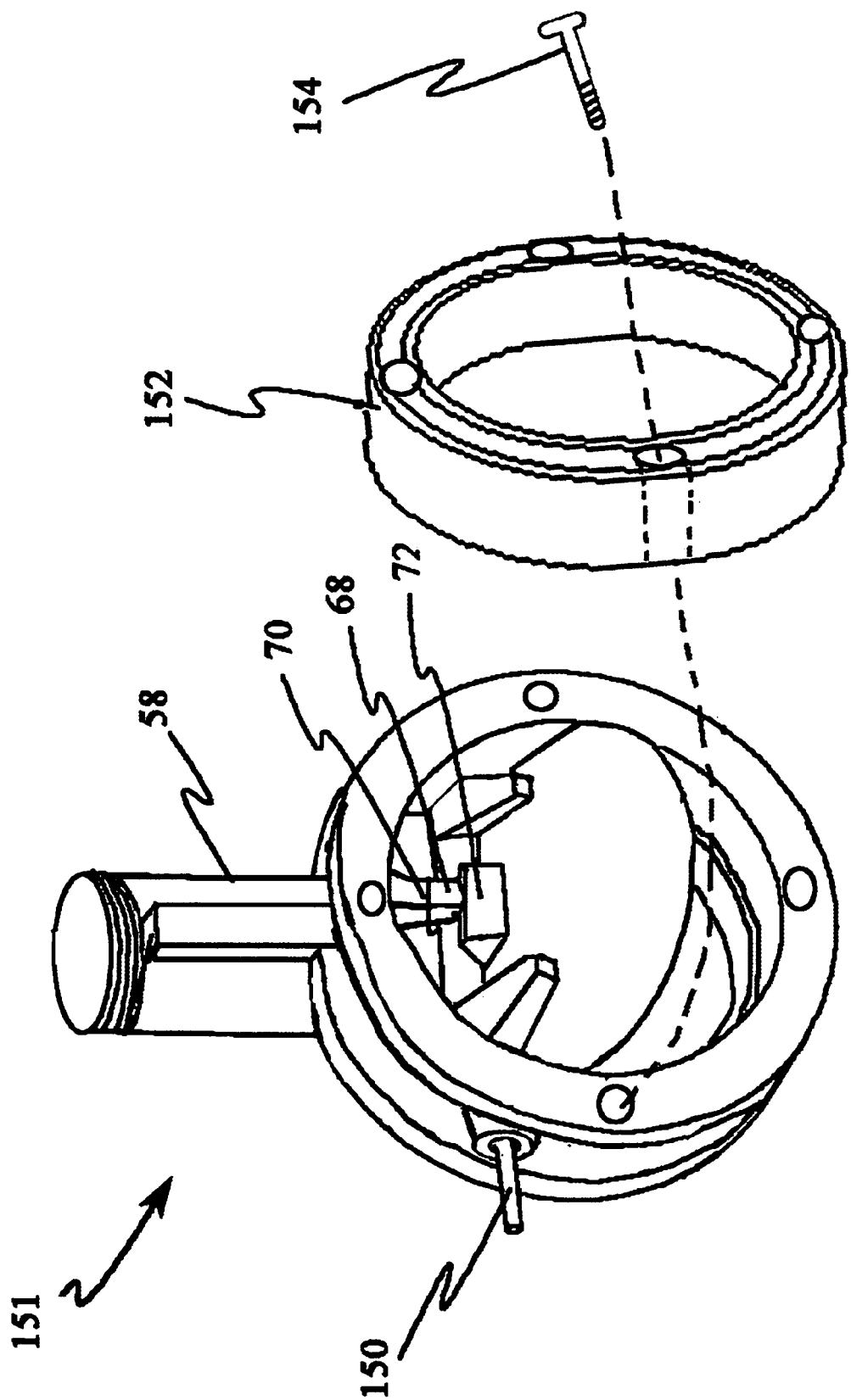
FIG. 14 is a side perspective view of a check valve module configured with an adapter.

The next step is to obtain a check valve module such as the exemplary check valve module shown in FIG. 14. In FIG. 14, a check valve module (151) is associated with a valve seat adapter (152) having the same physical dimensions as said flapper-valve seat (146). As shown in FIG. 14, the value seat adapter (152) is attached to the output side of check valve module (151) using bolts (154). It should be appreciated that any type of suitable fasteners may be use to associate the valve seat adapter (152) with the check valve module (151). Additionally, while FIG. 14 shows the valve seat adapter (152) attached to the output side of the check valve module (151). Such adapter may also be attached to the input side of the check valve module (151). For such an embodiment, stem section (58) is moved to the output side of the check valve module. Additionally, the steps of removing flapper-valve seat (146) and associating a vale seat with the check valve module (151) are optional.

Check valve module (151) may further comprise a horizontal module shaft (150) that extends out both sides of check valve module (151). Horizontal module shaft (150) may be used to help secure the check valve module within the secondary housing (140).

Next, check valve module (151) is inserted into secondary chamber (140) so that secondary chamber (140) receives the check valve seal adapter. Additionally, horizontal module shaft (150) may be inserted into flapper-shaft-receivers (151) to help secure check valve module 151) within the secondary chamber (140).

Figure 15:
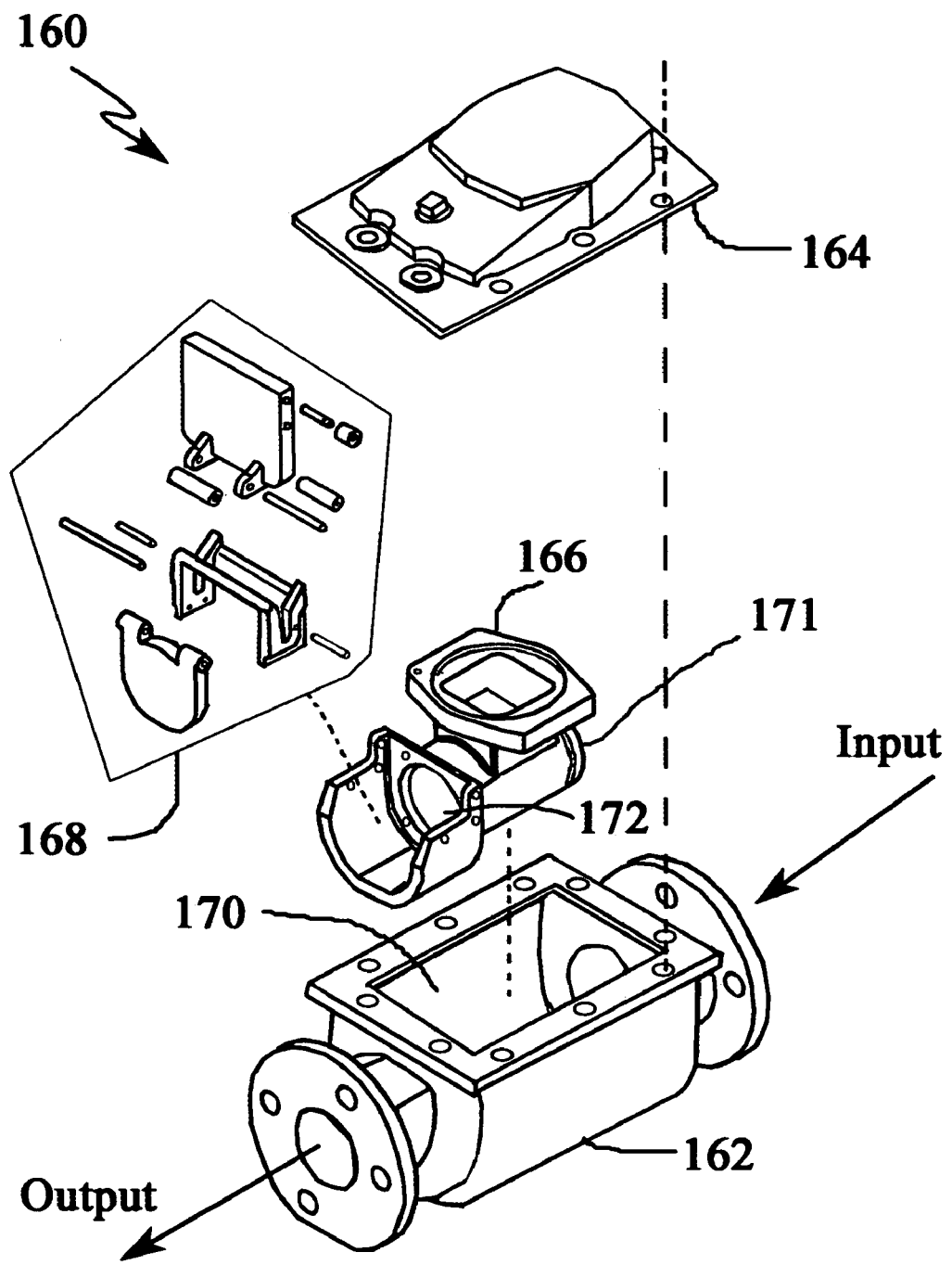
FIG. 15 is an exploded view of a prior art compound meter comprising a housing, a meter cage, and a multiple piece check valve assembly.

Referring to FIG. 15, another prior art compound meter (160) is shown. Compound meter (160) comprises housing (162). Housing (162) comprises a main chamber (170) configured to receive a meter cage (166). Fluid from a fluid source flows into housing (162) into the meter cage input (171), through meter cage (166), out the meter cage output (172), and out the housing (162) output. Meter cage (166) houses at least one metering element for measuring the flow rate of the fluid flowing through housing (162). Meter cage (166) is configured for receiving an exemplary high flow valve assembly (168) comprising as least one swing weight, main valve, spindle, roller, e-ring, shaft guide, and valve. High flow valve assembly (168) is configured for preventing fluid flow through the high flow output (172) until the fluid exerts a predefined pressure on the on the valve assembly. One example of such prior art meters the Rocordall® compound meter manufactured by Badger Meter, Inc.

As previously noted, repairing, replacing, recalibrating such a prior art high flow valve assembly is often a laborious endeavor that requires trained personnel. The following method was conceived for upgrading/modifying the multiple piece high flow valve assembly with a check valve module.

The first step in the method is to obtain a compound meter such as exemplary compound meter (160). The next step is to remove the high flow valve assembly components from the meter cage.

Next, an adapter seal is associated with a check valve module. The adapter seal is appropriately sized so that the adapter seal is received by high flow output (172) thereby forming a fluid tight seal between the check valve module and the high flow output (172). FIG. 14 shows one possible embodiment of a check valve module associated with an adapter seal. The horizontal shaft protrusion (150) may or may not be included. Additionally, as previously noted, the adapter seal may be associated with either the check valve module input or the check valve module output depending on the configuration desired.

The check valve module is then inserted into the meter cage so that the adapter seal is in fluid communication with high flow output (172). If the meter cage was removed from housing (162) to facilitate easer installation of the check valve module, the meter cage is then reinstalled in meter housing (162).

Attention now is directed to a module insert that may be use to replace substantially all the components of a flow meter. Referring again to FIG. 15, a prior art compound meter (160) is shown comprising a housing (162) for receiving and housing metering the various components shown in FIG. 15. As previously noted, the check valve assembly of such prior art meter is needlessly complicated, particularly pertaining to repairs and maintenance. Additionally, housing (162) as well as the metering components housed within housing (162) may be constructed from materials containing lead which may contribute to lead exposure by those who drink water metered by compound meter (160). Thus, there is a need for an apparatus and method of upgrading compound meter (160) with more modular and less complicated metering components that are substantially lead free.

Figure 16:
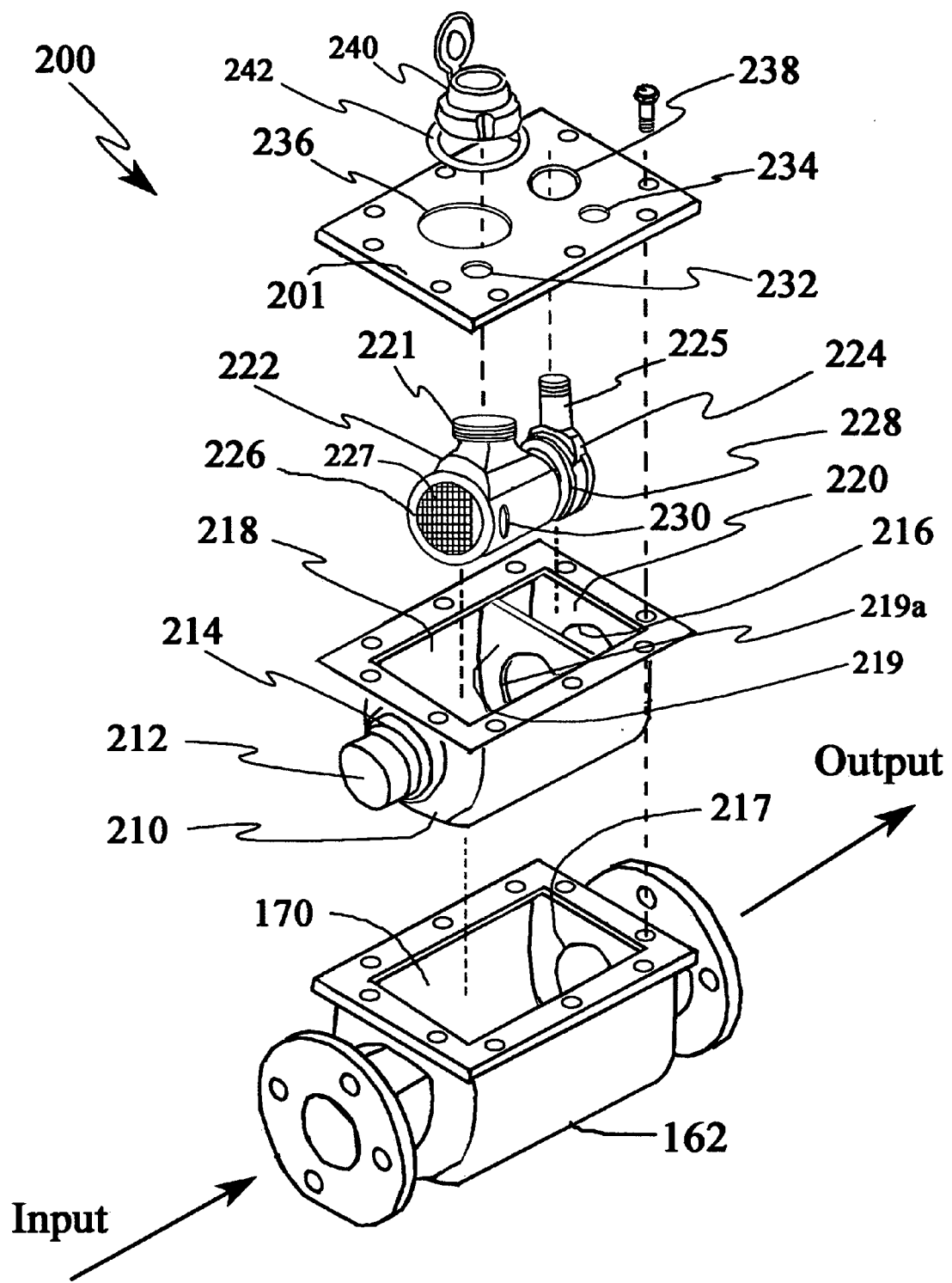
FIG. 16 is a side perspective view of a module insert comprising a meter and a check valve.

Referring now to FIG. 16, a module insert (200) is depicted. Module insert (200) is preferably configured to replace the original metering components of a flow meter measuring the flow of a commodity. Alternatively, module insert (200) may be used in new flow meters. For the exemplary embodiment of the invention shown in FIG. 16, module insert (200) is configured to fit within housing (162) of prior art compound meter (160). It should be noted that compound meter (160) may still be connected to a fluid delivery system.

One embodiment of module insert (200) comprises a housing insert (210) configured to fit within housing (162). For clarity, housing (162) will hereafter be referred to as main chamber (162). As previously noted, main chamber (162) has an import port and an output port configured to be associated with a commodity delivery system. Similarly, housing insert (210) comprises a housing insert chamber positioned between a housing input port (212) and a housing output port (216). Housing input port (212) is configurable to be associated with the main chamber input port and the housing output port (216) is configurable to be associated with the main chamber output port so that the commodity flows through the main chamber input port, flows through said housing insert chamber, and to said main chamber output port.

Preferably, housing insert (210) and the other module insert (200) components are made at least partially from plastic or some other material substantially free of lead. Such plastic materials are well known in the art and not discussed in detail in this document.

It should be noted that housing input port (212) is configured with a port seal (214) that is received by the main chamber input port to form seal between the housing input port (212) and the main chamber input port so that substantially all the fluid flowing into the main chamber input port flows into housing insert (210). Similarly, for some configurations of module insert (200), housing output port (216) may be configured with a port seal. As shown in FIG. 16*b*, port seal adapter (211) may be used to improve the seal between housing output port (216) and the main chamber output port. Port seal adapter (211) comprises a face plate (216*b*), a seal section (215), and tube section (217*a*). For this embodiment of the present invention, after inserting housing insert (210) into main chamber (162), port seal adapter (211) is inserted into housing insert (210) so that face plate (216*b*) is in communication with housing output port (216) and tube section (217*a*) extends through output port (216) thereby placing seal section (215) in fluid communication with the main chamber output port. Port seal adapter (211) may be secured in housing insert (210) with any type of suitable fasteners that are well known in the art. Preferably, such fasteners require no special tools to engage and disengage.

Referring back to FIG. 16, a meter (222) is disposed in housing insert (210) and configured to measure the flow rate of a commodity flowing through housing insert (210). Meter (222) is preferably a high flow meter such as the ones described previously in this document.

Module insert (200) may further comprise a check valve module. Check valve module (224) has an input side and an output side. For the preferred embodiment, check valve module (224) is disposed within housing insert (210) between said meter (222) and said housing output port (216) so that the commodity flows into the housing insert (210), through meter (222), into the input side of said check valve module (224), out the output side of said check valve module (224), and to said housing output port (216).

The check valve module (224) may further comprise a valve section and a stem section (225). As described previously, the valve section preferably comprises a flapper associated with a spring and configured to prevent the flow of said commodity through the check valve module (224) until said commodity exerts a predefined pressure on said flapper. The valve section may further comprise a seal (228). Seal (228) is suitably configured to be received by a valve seat (described below) to prevent substantial quantities of the commodity from flowing around the check valve module (224). The stem section (225) is attached to the valve section at one end and extends outwardly from the valve section terminating at a distal end of the stem section.

Module insert (200) may further comprise a screen element (227) positioned between the meter (222) and the housing input port (212). With such a configuration, the commodity flows through the screen element (227) before flowing through the meter (222). It should be noted that FIG. 16 shows screen element (227) associated with the input of meter (222). It will be appreciated that screen element (227) may be a separate component without departing from the scope of the present invention.

Housing insert (210) may further comprises a divider wall (219) for dividing the housing insert chamber into a meter chamber (218) and check valve chamber (220). The divider wall (219) further comprises seal seat (219*a*) configured for receiving check valve seal (228). It should be noted that sliding the check valve seal (228) into seal seat (219*a*) helps secure valve module (224) in check valve chamber (220).

Module insert (200) may further comprise a housing plate (201) that is detachably associated with meter (222) and check valve module (224). For this embodiment of the invention, Meter (222) comprises magnetic section (221) and register section (240). Magnetic section (221) houses the components that convert the kinetic energy of the commodity flowing through meter (222) into a measurement movement that is detected and registered by register section (240). Magnetic section (221) extends through housing plate (201) and is then associated with register section (240) thereby securing meter (222) to housing plate (201). Register seal (242) may be use to improve the seal between meter (222) and housing plate (201).

Similarly, the stem section (225) of check valve module (224) is detachably associated with housing plate (201) with the stem section (225) extending through housing plate (201). As noted previously, stem section (225) may comprise a flow path for allowing the commodity at the output side of said check valve module (224) to flow to the distal end of said stem section (225). The distal end may be terminated with any suitable device such as a plug, a cap, or a shutoff valve such as the one shown in FIG. 9.

Module insert (200) may further comprise a low flow access port (232) and a bypass port (234). Low flow access port (232) provides access to the commodity at the housing input port (212). Similarly, bypass port (234) provides access to the commodity at the housing output port (216). It should be noted that while this embodiment of the present invention has low flow access port (232) located on housing plate (201), is will be appreciated that low flow access port (232) may be positioned in any suitable location providing access to the commodity at housing input port (212). Similarly, bypass port (234) may be positioned in any suitable location that provides access to the commodity at the housing output port (216). That being said, both such ports are positioned on housing plate (201) for this embodiment of the present invention.

It should be noted that meter (222) provides a low flow conduit (230) between the housing input port (212) and the low flow access port (232) for the embodiment shown in FIG. 16. Low flow conduit (230) extends from the side of meter (222) to the front of screen element (227). Such a configuration minimizes flow disruption providing a more stream line flow into meter (222).

Figure 17:
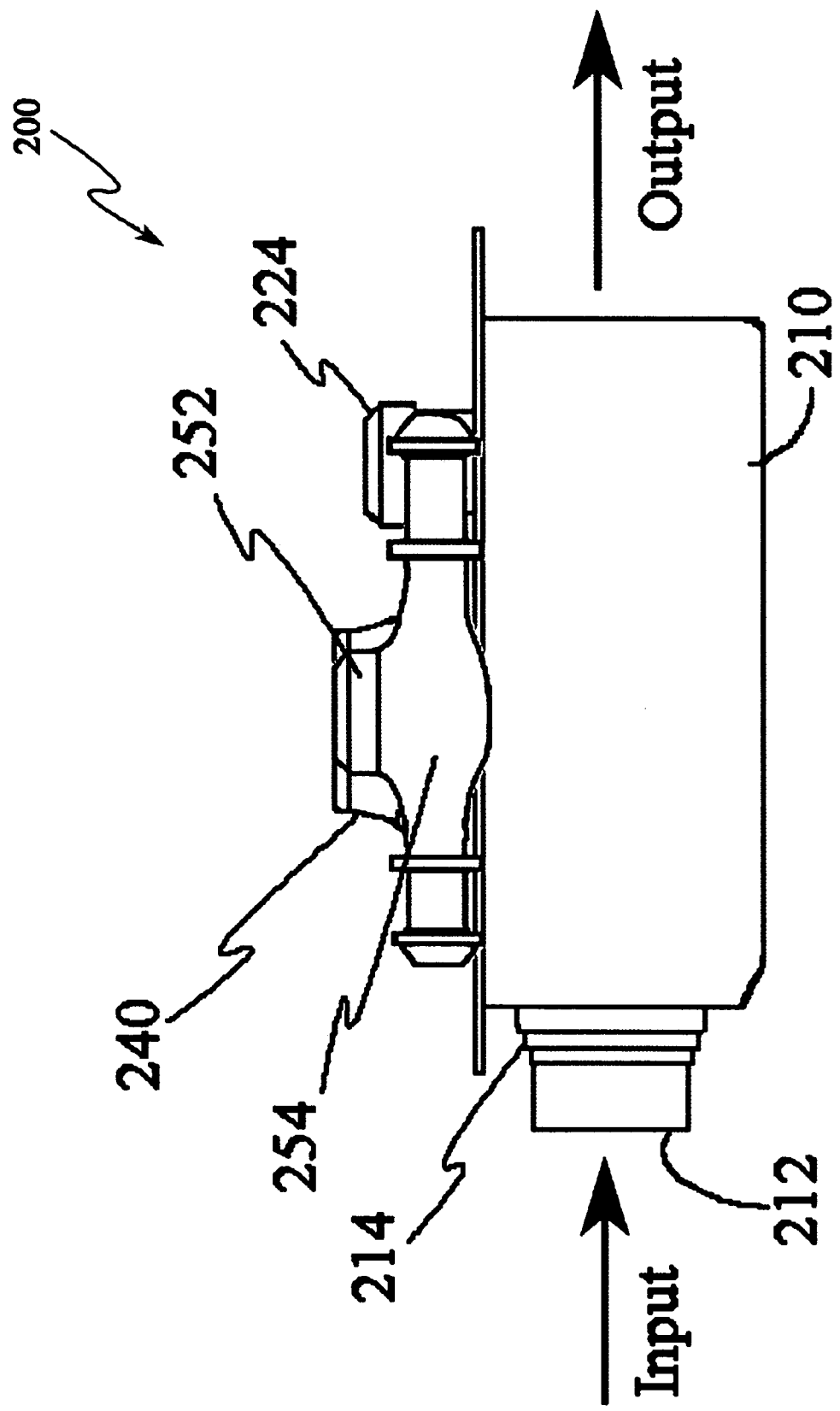
FIG. 17 is a side view of a combo meter configured as a module insert.

Referring now to FIG. 17, module insert (200) may further comprise bypass arm (254), similar to bypass arm (134) shown in FIG. 10, and configured for measuring low flow rates. The bypass arm (254) comprises a low flow input port, a low flow output port, and a low flow meter (252). The low flow import port is associated with said low flow access port (232). The low flow output port is associated with the bypass port (234). With this configuration, the commodity flows from the housing input port (212), through the bypass arm (254) and back into the housing insert (210). Low flow meter (254) is configured for measuring the flow rate of the commodity flowing through the bypass arm.

Figure 18:
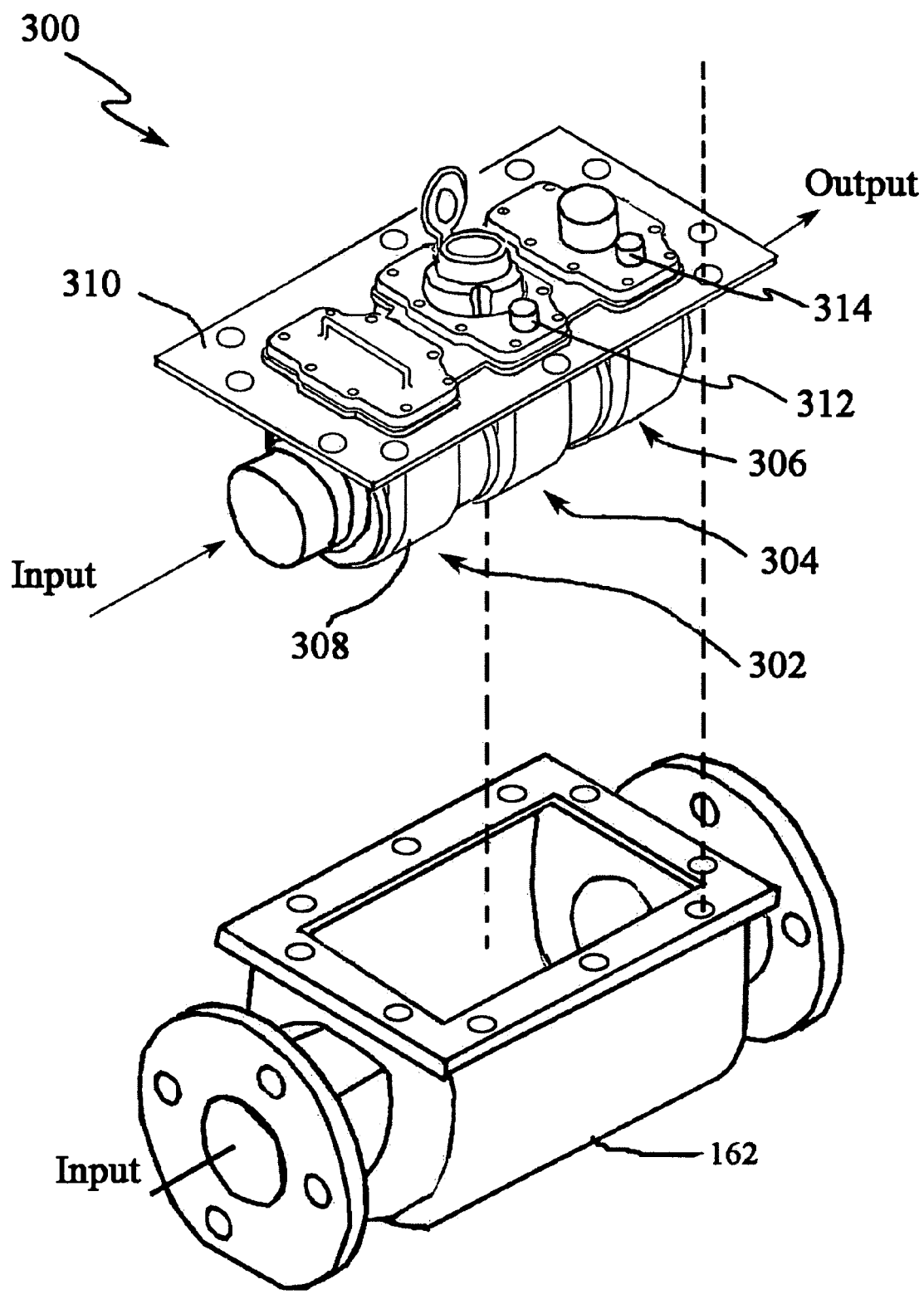
FIG. 18 is a side perspective view of a module insert comprising a screen section, a high flow meter section, a check valve section, and access ports for attaching a low flow meter section.

Another embodiment of module insert (200) is shown in FIG. 18. In FIG. 18, module insert (300) comprises a screen section (302), a metering section (304) and a check valve section (306) housed in housing insert (308). A low flow access port (312) is associated with meter section (304) and a bypass port (314) is associated with check valve section (306). The various sections are associated with a housing plate (310). Housing plate (310) is suitably sized to be detachably associated with main chamber (162). Screen section (302), metering section (304) and check valve section (310) have the same or similar attributes described previously for each respective section. A bypass arm, such as bypass arm (254) may be connected to low flow access port (312) and bypass port (314) for metering solutions requiring a compound meter. It should be apparent that the module insert depicted in FIG. 18 provides an apparatus and method for quickly upgrading meters installed at customers sites or used meters returned for repairs. In addition, in locations where local governments require eliminating meters containing unacceptable amounts of lead, the module insert shown in FIG. 18 provides for a fast and cost effective solution.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. An apparatus for measuring fluid flow, said apparatus comprising:
a housing having a fluid input and a fluid output, wherein said housing is associated with a fluid source so that fluid enters said housing through the fluid input and exits said housing through the fluid output;
said housing further comprising a first meter chamber and a check valve chamber suitably arranged to allow fluid to flow through the first meter chamber when fluid flows through the check valve chamber;
a first metering element disposed at least partially within said first meter chamber and detachably received thereby;
a first meter chamber plate detachably associated with the first meter chamber with fasteners external to the first meter chamber thereby securing the first metering element at least partially within said first meter chamber;
wherein the first metering element is configured to measure the flow of fluid through the first meter chamber;
wherein said check valve chamber is configured with a valve seat for receiving a check valve seal;
a check valve module having an input side and an output side and associated with a check valve seal;
wherein said check valve module is disposed at least partially within said check valve chamber with the check valve seal being received by the valve seat;
a check valve chamber plate detachably associated with the check valve chamber with fasteners external to the check valve chamber thereby securing the check valve module at least partially within the check valve chamber;
wherein the check valve module is configured to open and permit said fluid to flow through the check valve chamber when the pressure exerted on the input side of the check valve module exceeds a predefined open pressure value; and
wherein the check valve module is configured to prevent said fluid from flowing through the check valve chamber when the pressure exerted on the input side of the check valve module is below a predefined close pressure value.

2. An apparatus for measuring fluid flow as in claim 1, wherein the check valve chamber plate is integral to the check valve module, and wherein the check valve module may be removed from said housing without disturbing the metering element.

3. An apparatus for measuring fluid flow as in claim 1, wherein said apparatus further comprises:
a test port in fluid communication with the fluid at the output side of the check valve;
a first auxiliary port in fluid communication with said test port;
a second auxiliary port in fluid communication with the fluid at the input side of the check valve.

4. An apparatus for measuring fluid flow as in claim 3, wherein:
said first auxiliary port is positioned on said check valve chamber plate;
wherein a pressure measurement device is coupled to said second auxiliary port for providing an indication of the fluidic pressure at the input side of the check valve; and
said apparatus further comprising a shutoff valve having a shutoff valve input, a shutoff element, and at least one shutoff valve output and wherein said shutoff valve input is coupled to said first auxiliary port and wherein a pressure measurement device is coupled to said at least one shutoff valve output.

5. An apparatus for measuring fluid flow as in claim 1, wherein:
said check valve module comprises a valve portion and a stem portion, said stem portion having a distal end located at the free end of the stem portion; and
said stem portion extending through said check valve chamber plate so that said distal end is located outside the check valve chamber.

6. An apparatus for measuring fluid flow as in claim 5, wherein a test port is located at the distal end of said stem portion and where said stem portion comprises a fluid path configured to permit fluid from the output side of the check valve module to flow to the distal end.

7. An apparatus for measuring fluid flow as in claim 1, wherein said housing further comprises:
- a screen chamber having a screen chamber input port and a screen chamber output port and wherein said screen chamber is positioned within said housing so that said fluid flows into the screen chamber input port, through the screen chamber, and out the screen chamber output port to the remainder of said housing;
- at least one screen element disposed within the screen chamber and detachably received thereby, said screen element being disposed between the screen chamber input port and the screen chamber output port; and
- a screen chamber plate for detachably enclosing said screen element inside the screen chamber.

8. An apparatus for measuring fluid flow as in claim 1, further comprising:
- a screen chamber having a screen chamber input port, a HFSCO port, and a LFSCO port, said screen chamber configured so that fluid flows into said screen chamber input port, through the screen chamber, and out at least one of (1) said HFSCO port, and (2) said LFSCO port;
- at least one screen element disposed within the screen chamber and detachably received thereby;
- a screen chamber plate for detachably enclosing said screen element inside the screen chamber; and
- wherein said screen chamber is located at the fluid input of said housing so that fluid flows through the screen chamber before flowing through the remainder of the housing.

9. An apparatus for measuring fluid flow as in claim 8, wherein said screen element is associated with the screen chamber plate so that the screen element is removed from the screen chamber when the screen chamber plate is removed from the screen chamber.

10. An apparatus for measuring fluid flow as in claim 8, further comprising:
- a second meter enclosure having a sme-input and a sme-output;
- a second metering element disposed within said second meter enclosure and detachably received thereby;
- wherein said housing further comprises a bypass port positioned between said check valve chamber and the fluid output of said housing;
- wherein said sme-input is associated with said LFSCO port and said sme-output is associated with said bypass port for allowing fluid to flow from the fluid input of said housing, through the screen chamber, out the LFSCO port, to said sme-input, through said second meter enclosure, out said sme-output, through said bypass port, and back into said housing; and
- wherein said second metering element is configured to measure the flow of fluid through the second meter enclosure.

11. An apparatus for measuring fluid flow as in claim 10, wherein said screen element comprises an universal input screening surface, a high flow screening surface, and a low flow screening surface.

12. An apparatus for measuring fluid flow as in claim 10, wherein the interior of said screen chamber comprises four perimeter slot sections defining a central void in the middle of the screen chamber.

13. An apparatus for measuring fluid flow as in claim 12, wherein at least one of (a) a high flow restrictor plate is disposed within one of said perimeter slot sections, (b) a low flow restrictor plate is disposed within one of said perimeter slot sections; and (c) said screen element is disposed within said central void.

14. A test ready check valve module for use in flow meters, said module comprising:
- an enclosure configured with an input port, an output port, and a valve seat, wherein said valve seat is positioned on the output side of the enclosure;
- a check valve disposed between the input port and the output port, said check valve comprising a valve portion and a stem portion and wherein said check valve is configured for controlling the flow of a substance between the input port and the output port;
- said valve portion comprising a valve seal positioned on the output side of the check valve and configured to mate with said valve seat;
- said valve portion further comprising a flapper associated with a spring;
- said flapper configured to open and allow the substance to flow through the check valve module when the pressure exerted by the substance on the input side of the flapper reaches a predefined open value;
- said flapper configured to prevent the substance from flowing through the check valve module when the pressure exerted by the substance on the input side of the flapper falls below a predefined close value;
- a stem portion extending outwardly from said valve portion and terminating at the distal end of the stem portion; and
- a check valve plate configured to detachably attach to said check valve enclosure using fasteners external to the check valve enclosure thereby securing the check valve in place.

15. A test ready check valve module as in claim 14, wherein said stem portion extends through the check valve plate.

16. A test ready check valve module as in claim 15, wherein said stem portion further comprises at least one flow path for allowing the substance at the output port of the enclosure to flow to said distal end thereby creating a test port;
- said check valve plate further comprising a first auxiliary port in communication with the substance at the test port; and
- said enclosure further comprising a second auxiliary port in communication with the substance at the input port of the enclosure.

17. An apparatus for measuring flow of a commodity, said apparatus comprising:
- a housing configured with a screen chamber, a meter chamber, a valve chamber, a housing input port and a housing output port, said housing configured to connect to a commodity delivery system so that said commodity flows into the housing input port and to the input of the screen chamber, flows through the screen chamber and to the input of the meter chamber, flows through the meter chamber and to the input of the valve chamber, flows through the valve chamber and to the housing output port;
- a first metering element disposed at least partially within said meter chamber and detachably received thereby;
- a meter chamber plate for at least partially enclosing said first metering element within said meter chamber, wherein said meter chamber plate is attached to said housing with at least one fastener external to said housing;

wherein the first metering element is configured to measure the rate of flow of said commodity through the meter chamber;

a valve seat positioned within said valve chamber for receiving a valve seal;

a valve having an input side and an output side, said valve associated with a valve seal configured to mate with said valve seat for preventing flow around the valve;

wherein said valve is disposed at least partially within said valve chamber so that the valve seal is received by the valve seat;

a valve chamber plate detachably attached to the valve chamber with at least one fastener external to the valve chamber for securing the valve;

wherein said valve is configured to permit the commodity to flow through the valve chamber when the pressure exerted on the input side of the valve by said commodity exceeds a predefined open pressure value;

wherein the valve is configured to prevent the commodity from flowing through the valve chamber when the pressure exerted on the input side of the valve by said commodity is below a predefined close pressure value;

at least one screen element disposed within the screen chamber and detachably received thereby, said screen element positioned within said screen chamber so that substantially all of the commodity flows through the screen element before flowing out of the screen chamber;

a screen chamber plate for detachably enclosing said screen element inside the screen chamber;

wherein the meter element is removable from said housing (1) by removing only external fasteners from the meter chamber plate, and (2) without disturbing the valve; and wherein the valve is removable from said housing (1) by removing only external fasteners from the valve chamber plate, and (2) without disturbing the meter.

18. An apparatus for measuring flow of a commodity as in claim 17, wherein said valve seat is positioned on the output side of the valve chamber and wherein the valve seal is positioned on the output side of the valve so that the flow of said community tends to push the valve seal into the valve seat.

19. An apparatus for measuring flow of a commodity as in claim 18, wherein said housing further comprises a housing low flow port associated with the screen chamber and a valve bypass port positioned between the vale chamber and the housing output; and wherein the apparatus further comprises a low flow arm configured with a low flow input, a low flow output, and a low flow meter, said low flow input associated with the housing low flow port, and said low flow output associated with the valve bypass port so that fluid flows from the housing, through the low flow arm and back into the housing.

* * * * *